United States Patent
Horsfall et al.

(10) Patent No.: US 7,363,269 B2
(45) Date of Patent: Apr. 22, 2008

(54) CONVERSATIONAL DEALING SYSTEM

(75) Inventors: Peter R. Horsfall, Morristown, NJ (US); Alexander C. Riseman, New York, NY (US)

(73) Assignee: EBS Group Limited, London (GB)

( * ) Notice: Subject to any disclaimer, the term of this patent is extended or adjusted under 35 U.S.C. 154(b) by 845 days.

(21) Appl. No.: 09/753,940

(22) Filed: Jan. 3, 2001

(65) Prior Publication Data
US 2002/0143685 A1  Oct. 3, 2002

(51) Int. Cl.
G06Q 40/00 (2006.01)
(52) U.S. Cl. .................... 705/37; 35/39; 345/753; 364/408; 375/355
(58) Field of Classification Search .............. 705/37, 705/39, 1, 35; 345/753, 733
See application file for complete search history.

(56) References Cited

U.S. PATENT DOCUMENTS

| | | | |
|---|---|---|---|
| 4,388,489 A | | 6/1983 | Wigan et al. |
| 4,525,779 A | | 6/1985 | Davids et al. |
| 4,531,184 A | | 7/1985 | Wigan et al. |
| 4,555,781 A | | 11/1985 | Baldry et al. |
| 4,980,826 A | * | 12/1990 | Wagner ................. 705/37 |
| 5,003,473 A | | 3/1991 | Richards et al. |
| 5,034,916 A | | 7/1991 | Ordish |
| 5,195,031 A | | 3/1993 | Ordish |
| 5,258,908 A | | 11/1993 | Hartheimer |
| 5,727,165 A | * | 3/1998 | Ordish et al. ........... 705/37 |
| 5,787,402 A | * | 7/1998 | Potter et al. ............ 705/37 |
| 5,936,801 A | * | 8/1999 | Boutaghou et al. ...... 360/234.7 |
| 6,138,100 A | * | 10/2000 | Dutton et al. ........... 704/275 |
| 6,421,653 B1 | * | 7/2002 | May ..................... 705/37 |
| 2004/0167847 A1 | | 8/2004 | Nathan |

FOREIGN PATENT DOCUMENTS

| | | |
|---|---|---|
| GB | 2 224 141 A | 4/1990 |
| WO | WO-98/09228 | 3/1998 |

OTHER PUBLICATIONS

PRNewswire "Reuters Launches Dealing 3000", Jan. 19, 2000, New York.*

(Continued)

*Primary Examiner*—Harish T. Dass
(74) *Attorney, Agent, or Firm*—Dickstein Shapiro LLP

(57) ABSTRACT

A conversational trading system allows a plurality of instruments, for example financial instruments such as foreign exchange products to be traded from a single user interface. The interface includes a deal stack comprising a deal list, a deal detail panel and a button bar. The deal list displays deal related information such as status, party, instrument and an instrument and status related string in a form common to all instruments. The deal detail panel displays information relating to a specific deal in the list that has been selected by the trader in a manner that is specific to the instrument being traded. Deal related information may be entered into the system by trader conversations which are parsed by a parser. The parser analyses the conversation for key terms which depend on the status of the deal. Where a key term is found, the deal status is changed and the deal stack sends appropriate messages to the system which may cause counterparty deal details to change. Deal information may also be entered directly without the use of parsed conversation.

43 Claims, 7 Drawing Sheets

HAZELNUT APPLICATION FRAMEWORK—SYSTEM OPERATION MODEL

OTHER PUBLICATIONS

Oliviero Stock "Natural Laguage and Exploration of an Information space: the ALFresco Interactive System", IRST—Istituto per la Ricerca Scientifica e Tecnologica, 38050 Povo, Trento, Italy.*

European Search report issued Jan. 19, 2005.

Reuters Dealing 3000 Direct User Guide.

* cited by examiner

| | STATUS | TIME | TRADER/BANK | INSTRUMENT | IDEA |
|---|---|---|---|---|---|
| | CONTACTING | 13:35:23 | peter@CITQ | SPOT | REQUEST 2.5 mil USD.cad |
| PICKUP? | | 13:36:12 | peter@CITQ | SPOT | CAN I QUOTE 5 mil EUR.usd |
| QUOTE? | | 13:37:43 | peter@CITQ | SPOT | CAN I QUOTE 32 mil JPY usdJPY |
| I BOUGHT | | 13:38:55 | jc@CHMN | FORWARD | I BOUGHT 100mil USDA.jpy 3m OVER AUG 25 00@54.4 |
| NOTHING DONE | | 13:39:01 | jim@UBSN | FORWARD | NOTHING DONE ON MY 83.88 FOR 180.33mil EUR.usd 17d OVER AUG 25 00 |
| DEAL? | | 13:39:00 | phil@CITQ | FORWARD | cply QUOTED 14.50 15.25 FOR 3,000 JPY USD jpy 3m/6m OVER 28 NOV 00 |

CONTACTING 13:35:23 peter@CITQ SPOT AMOUNT CCY PAIR VAL DATE: BID: OFFER: DEAL:
2.5 USD.cad 30 AUG 2000

| PICKUP | CHAT | HOLD | TRANSFER | SELL | RFQ | CALLOUT | BUY | | CANCEL | CLEAR | ALL | OFF | ALL |

FIG. 5

| | STATUS | TIME | TRADER/BANK | INSTRUMENT | IDEA |
|---|---|---|---|---|---|
| | CONTACTING | 13:35:23 | peter@CITQ | SPOT | REQUEST 2.5 mil USD.cad |
| PICKUP? | | 13:36:12 | peter@CITQ | SPOT | CAN I QUOTE 5 mil EUR.usd |
| WAITING ACCEPT | | 13:37:43 | peter@CITQ | SPOT | CAN I QUOTE 3,200 mil JPY usdJPY |
| I BOUGHT | | 13:38:55 | jc@CHMN | FORWARD | I BOUGHT 100mil USDA.jpy 3m OVER AUG 25 00@54.4 |
| NOTHING DONE | | 13:39:01 | jim@UBSN | FORWARD | NOTHING DONE ON MY 83.88 FOR 180.33mil EUR.usd 17d OVER AUG 25 00 |
| | | 13:39:00 | phil@CITQ | FORWARD | cply QUOTED 14.50 15.25 FOR 3,000 JPY USD jpy 3m/6m OVER 28 NOV 00 |

I BOUGHT 13:37:43 peter@CITQ SPOT AMOUNT CCY PAIR VAL DATE: BID OFFER: DEAL:
3200 JPY USD JPY 31 AUG 2000 105.9 105.-

| QUOTE | CHAT | HOLD | FORWARD | SELL | RFQ | CALLOUT | BUY | | NOTHING | CLEAR | ALL | OFF | ALL |

| | | STATUS | TIME | TRADER/BANK | INSTRUMENT | DEAL |
|---|---|---|---|---|---|---|
| | | CONTACTING | 13:35:23 | peter@CITQ | SPOT | I REQUEST 2.5 mil USD.cad |
| LOGOUT | | PICKUP? | 13:36:12 | peter@CITQ | SPOT | CAN I QUOTE 5 mil EUR.usd |
| | | WAITING ACCEPT | 13:37:43 | peter@CITQ | SPOT | CAN I QUOTED 105.98–105.99 FOR 3,200 mil JPY usd.JPY |
| | | I BOUGHT | 13:38:55 | jc@CHMN | FORWARD | BOUGHT 100mil USDA.jpy 3m OVER AUG 25 00@54.4 |
| | | NOTHING DONE | 13:39:01 | jim@UBSN | FORWARD | NOTHING DONE ON MY 83.88 FOR 180.33mil EUR.usd 17d OVER AUG 25 00 |
| ABOUT | | WAITING ACCEPT | 13:39:00 | phil@CITQ | FORWARD | cply QUOTED 14.50 15.25 FOR 3,000 JPY USD jpy 3m/6m OVER 28 NOV 00 |
| | | 13:37:43 peter@CITQ | SPOT AMOUNT 3200 | CCY PAIR JPY usd.JPY | VAL DATE: 31 AUG 2000 | BID 105.98 OFFER: 105.99 DEAL: |
| | | PICKUP | CHAT | HOLD | TRANSFER | SELL | RFQ | CALLOUT | BUY | INTERRUPT | CLEAR ALL | OFF ALL |

FIG. 9

| | | STATUS | TIME | TRADER/BANK | INSTRUMENT | DEAL |
|---|---|---|---|---|---|---|
| | | CONTACTING | 13:35:23 | peter@CITQ | SPOT | I REQUEST 2.5 mil USD.cad |
| LOGOUT | | PICKUP? | 13:36:12 | peter@CITQ | SPOT | CAN I QUOTE 5 mil EUR.usd |
| | | I BUY | 13:37:43 | peter@CITQ | SPOT | BUY 3,200 JPYusd.JPY@105.98 |
| | | I B/S CONFIRM? | 13:38:55 | jc@CHMN | FORWARD | BOUGHT 100mil USDA.jpy 3m OVER AUG 25 00@54.4 |
| | | NOTHING DONE | 13:39:01 | jim@UBSN | FORWARD | NOTHING DONE ON MY 83.88 FOR 180.33mil EUR.usd 17d OVER AUG 25 00 |
| ABOUT | | I BUY | 13:39:00 | phil@CITQ | FORWARD | cply QUOTED 14.50 15.25 FOR 3,000 JPY USD jpy 3m/6m OVER 28 NOV 00 |
| | | 13:37:43 peter@CITQ | SPOT AMOUNT 3200 | CCY PAIR JPY usd.JPY | VAL DATE: 31 AUG 2000 | BID 105.98 OFFER: 105.99 DEAL: |
| | | PICKUP | CHAT | HOLD | TRANSFER | SELL | RFQ | CALLOUT | BUY | CLEAR | CLEAR ALL | OFF ALL |

CONVERSATIONAL DEALING SYSTEM

FIELD OF THE INVENTION

This invention relates to dealing systems and in particular to conversational dealing or trading system dealing in instruments between parties. It is particularly, but not exclusively, related to financial trading and dealing systems which trade various financial instruments.

BACKGROUND TO THE INVENTION

It has become commonplace to trade financial instruments using computer systems. These have, to a large extent, replaced open outcry trading methods in which traders traded face to face on trading floors. Various computerised trading systems have evolved for trading different instruments such as foreign exchange spot (FX Spot), forward rate agreement (FRAs) and other instruments. Some systems are anonymous, in that the counterparties to a trade do not know the identity of other counterparties in the market until a deal has been done. Successful anonymous trading systems have bee operated for a number of years by EBS Dealing Resources, Inc. and by Reuters plc. The latter company has also run a conversational dealing system known as Reuters 2000/1 which computerises the conversational exchange between traders in reaching a deal allowing deal negotiation between traders.

Existing dealing systems have tended to support traders trading a single instrument. In large institutions, where a given trader only trades a single instrument this does not cause any difficulties. However, in smaller institutions, a foreign exchange trader, for example, may trade several types of instruments for one or more currency pairs. It is inconvenient for such a trader to have to use several different trading systems or to have to use a mix of computerised systems and traditional trading methods such as voice brokers.

There is, therefore, a need for a system which integrates trading of a number of instruments on a single platform to simplify trading, particularly for traders in smaller institutions.

Financial markets such as foreign exchange markets can operate at extreme speed. Dealers are required to react to market activity near instantaneously to avoid losing potential deals. As a result, the trader terminal must be visually very simple and easy for the trader to assimilate new or changing information. The ability to trade a number of different instruments from a single terminal adds to the complexity and can lead to more information being presented to the trader.

At any one time, a trader may be involved in many deals, some which will mature into done deals and others which will be cancelled at some stage prior to completion. These deals may be in a variety of instruments. Each of these deals will have instrument specific information which the trader must be able to see to enable him to make the deal. However, displaying all this information on the screen makes the screen visually hard to interpret for the trader and is, therefore, not desirable.

SUMMARY OF THE INVENTION

The invention resides in the use of parsing to detect terms in conversation which indicated a change in deal status. After that, other deal related processing is performed by the deal stack.

More specifically, there is provided a conversational dealing system for trading instruments between counterparties, comprising a plurality of trader terminals each having a user interface for inputting and displaying to the trader deal related information, the trader terminals communicating with each other via a communications network, wherein the trader terminals user interfaces further comprise: a deal stack holding a plurality of deals in which the trader is participating, the deal stack including the status of each deal and a deal description; and means for entering conversational deal related information;

and the trader terminals further comprise: a parser for parsing the conversational deal related information to detect a change in deal status; and for notifying the deal stack of the change in deal status;

whereby on receipt of a changed deal status notification, the deal stack generates deal string appropriate to the new deal status.

Preferably, the parser is deal status dependent, whereby the parser parses conversation input by the trader to detect in the conversation a predetermined content related to the deal status. When this predetermined content is detected, the parser registers a change in deal status.

In one preferred embodiment, the system analyses the parsed deal status information provided by the parser to detect the presence of a plurality of predetermined deal variables. Preferably, where a deal is initiated by a taker the parser only parses conversation input into the system my the deal maker. Preferably, in the absence of any deal related information in the parsed conversation, the parser monitors the conversation for a request for a quote (RFQ).

Preferably, the parser has a list of terms pertinent to each deal stage for a given instrument and, on detection of a term in the list for a given deal stage, parses the terms and variables in the conversation.

In a preferred embodiment of the invention, the system includes means for inputting non-conversational deal related information. This means may comprise deal status dependent buttons on the deal stack and/or a plurality of deal status dependent keyboard driven menus.

In a preferred embodiment, the means for entering conversational deal related information comprises a conversation panel in the user interface. Preferably, each deal in the deal stack has an associated conversation which may be selectively viewed in the conversation panel. Preferably, when a trader uses the buttons or menus to enter deal related information into the system, the system converts the deal information into conversation using best practice conversation.

Preferably, the deal stack further includes a messaging system for sending deal related messages to the dealing system when the status of a deal in the deal stack changes, the messages sent being dependent on the status of the deal. The deal stack may also change the configuration of the button bar in accordance with a change in deal status.

The invention also provides a conversational dealing system for trading instruments between counterparties, comprising a plurality of trader terminals each having a user interface for inputting and displaying to the trader deal related information, the trader terminals communicating with each other via a communications network, wherein the trader terminals user interfaces further comprise: a deal stack holding a plurality of deals in which the trader is participating, the deal stack including the status of each deal and a deal description; and a conversation panel for entering conversational deal related information; and the trader terminals further comprise a parser for parsing the conversational deal related information to detect a change in deal status; and for communicating to the deal stack the change in deal status; whereby a changed deal status causes a new deal string to be generated in the deal stack appropriate to the new deal status.

The invention still further provides a trader terminal for a conversational dealing system having a plurality of trader terminals for trading instruments between counterparty traders, the trader terminals communicating with each other via a communications network, the trader terminal comprising a user interface for inputting and displaying to the trader deal related information, the user interface further comprising: a deal stack holding a plurality of deals in which the trader is participating, the deal stack including the status of each deal and a deal description; and means for entering conversational deal related information; and the trader terminal further comprises: a parser for parsing the conversational deal related information to detect a change in deal status; and for notifying the deal stack of the change in deal status; whereby on receipt of a changed deal status notification, the deal stack generates deal string appropriate to the new deal status.

Embodiments of the invention have the advantage that by limiting the activity of the parser to detecting changes in deal status, the system can be made more flexible. This contrasts with prior art systems which operate by a rigid exchange of conversational messages in which only one trader can 'own' the cursor to a conversation at any one time. In the system of the present invention any party to a deal can enter conversations into the system at any time. However, if the conversation does not include terms which the parser is pre-programmed to recognise a deal related in that deal status, the conversation will not affect the deal process.

According to a second aspect of the invention there is provided A conversational dealing system for trading instruments between counterparties, comprising a plurality of trader terminals each having a user interface for inputting and displaying to the trader deal related information, the trader terminals communicating with each other via a communications network, wherein the trader terminals user interfaces further comprise: a deal stack holding a plurality of deals in which the trader is participating, the deal stack including the status of each deal and a deal description; and means for entering deal related information as conversations between traders; means for entering deal related information directly to the deal stack; and the trader terminals further comprise: a parser for parsing the conversational deal related information to detect a change in deal status; and for notifying the deal stack of the change in deal status; whereby on receipt of a changed deal status notification from the parser of from deal related information entered via the direct deal entering means, the deal stack generates deal string appropriate to the new deal status.

The second aspect of the invention also provides a trader terminal for a conversational dealing system having a plurality of trader terminals for trading instruments between counterparty traders, the trader terminals communicating with each other via a communications network, the trader terminal comprising a user interface for inputting and displaying to the trader deal related information, the user interface further comprising: a deal stack holding a plurality of deals in which the trader is participating, the deal stack including the status of each deal and a deal description; and means for entering deal related information as conversations between traders; means for entering deal related information directly to the deal stack; and the trader terminals further comprise: a parser for parsing the conversational deal related information to detect a change in deal status; and for notifying the deal stack of the change in deal status; whereby on receipt of a changed deal status notification from the parser of from deal related information entered via the direct deal entering means, the deal stack generates deal string appropriate to the new deal status.

Embodiments of the second aspect of the invention has the advantage that they offer the user additional flexibility. The trader has the choice of entering deal information through conversational chat which is parsed by the system or directly preferably using buttons on the user interface or keyboard driven menus. The trader can switch between the two during the progress of a deal. This flexibility is possible as the deal related information input, whether it is parsed conversation or direct input only conveys to the deal stack that there has been a change of deal status. All other deal related activities are performed by the deal stack and include sending necessary messages to the rest of the system, for example to other trader terminal of to back office systems to produce deal tickets. The deal stack is also responsible for changing the functionality of the buttons on the button bar and the keyboard menus which are all deal status dependent.

BRIEF DESCRIPTION OF THE DRAWINGS

An embodiment of the invention will now be described, by way of example only, and with reference to the accompanying drawings, in which:

FIG. 3 is a similar view to FIG. 2 showing a number of conversation panels;

FIG. 4 is a view of a deal stack within the user interface and showing the deal detail panel;

FIG. 5 is a further view of the deal stack and deal detail panel with a different deal highlighted in the deal detail panel from FIG. 4;

FIG. 6 is a further view of the deal stack showing a deal detail panel for a completed Forwards deal;

FIG. 7 is a further view of the deal stack showing the deal detail panel displaying an error box;

FIG. 8 is a still further view of the deal stack showing the deal detail panel displaying potentially modifiable fields highlighted;

FIG. 9 shows the deal stack with the deal detail panel showing a completed F/X Spot deal including the value of the done deal;

DESCRIPTION OF BEST MODE

Figure 1:
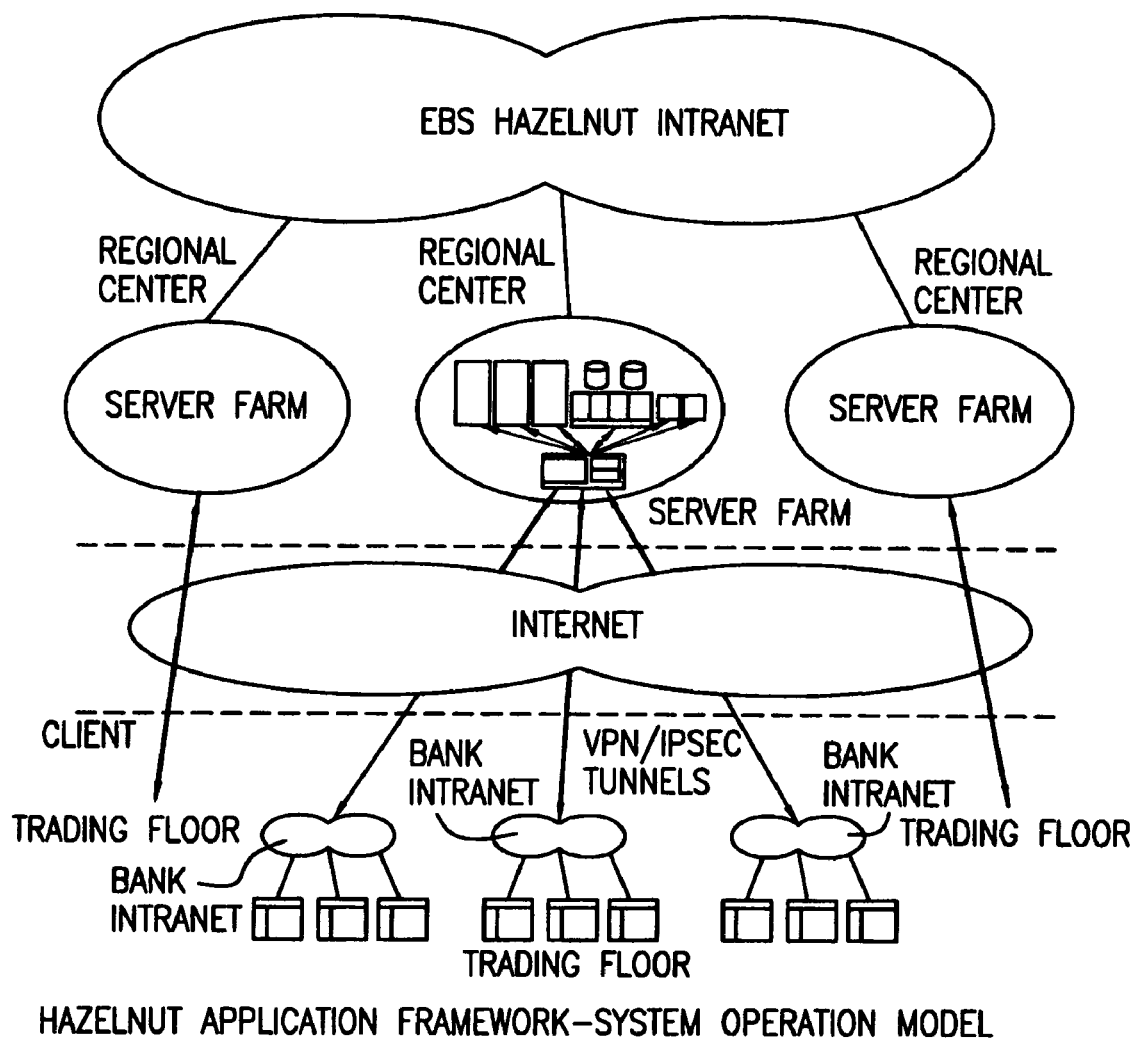
FIG. 1 is a schematic diagram of a trading system.

The system illustrated schematically in FIG. 1 is a conversational dealing system for trading a variety of financial instruments. Instruments which may be traded include, but are not limited to, foreign exchange (F/X) spot, forwards, and outrights. Although the following description will concentrate on F/X spot and forwards, it is to be understood that this is purely for the purposes of illustrating the invention and that the invention is not limited to any particular financial instruments or even to financial instruments. It is equally applicable to the trading of any other fungible such as commodities, metals, etc.

The illustrative system is an internet based system in which traders communicate with other trader from trader terminals across the internet. Trades are agreed upon by an exchange of messages between traders. The message content is automatically parsed by the system to identify deal related content for processing. Once the parsing has detected a deal status change, the remainder of the deal processing is handled by the deal stack. Deal status change need not be entered by conversation but may be directly input from the traders terminal, for example by using on screen function buttons or keyboard driven menus. Thus, the system also allows users to deal by a simple exchange of deal content data which is non-conversational and by a mixture of the two methods.

The following description gives an overview of the trading system within which the user interface is used by traders to execute deals. However, it is to be understood that this is only one example of a trading system suitable for use with the invention. The invention is not limited to any particular trading system but is applicable to any system in which a trader is trading multiple instruments. Such a system may be internet based or operate on a conventional public or private network. It may use a distributed architecture or operate using a central host or may be configured in any other manner.

Referring now to FIG. 1, the trading system disclosed is based on a plurality of server farms connected through a system intranet. The server farms communicate with trader terminals at bank trading floors through a communications network, here the Internet, and local bank intranets. The majority of deal processing takes place at trader terminals with deal messages being passed by the server farms to counterparty trader terminals. The server farms also pass done deal information to bank back office systems to enable deal tickets to be produced and trades to be settled. The deals are input into the system either directly by the trader or through parsed conversation exchanged between traders, as will be described. Parsing takes place at the trader terminals.

Figure 2:
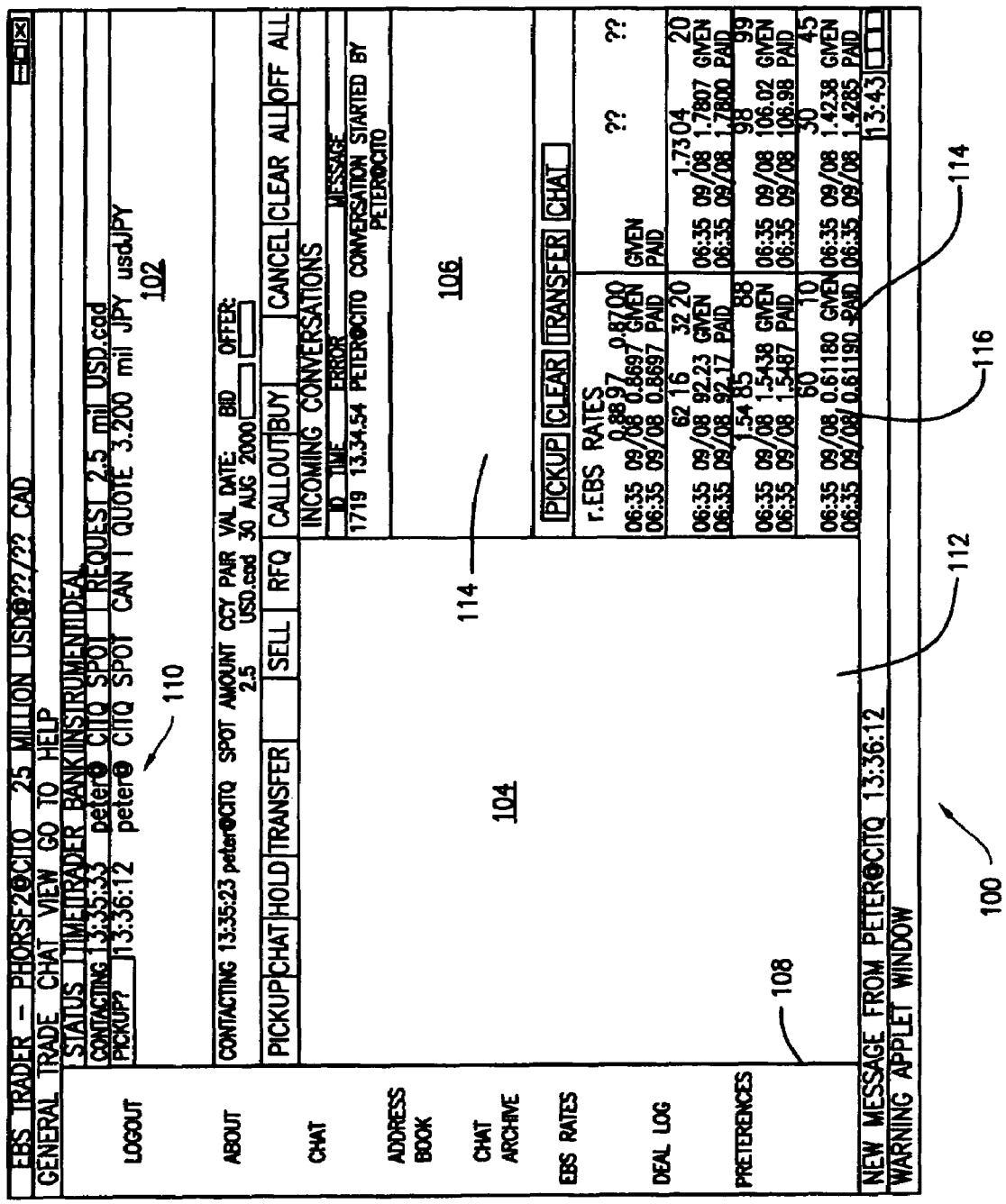
FIG. 2 is a view of the user interface of a trader terminal.

FIG. 2 shows the user interface which is displayed at each trader terminal. The display comprises a number panels. To an extent the panels displayed are configurable by each trader according to his or her preferences although some of the panels are permanent. In essence the display 100 includes three notional containers 102, 104 and 106. Container 102 is the upper of the three containers and extends across the width of the display, beneath the upper container is a lower left container 104 and a lower right container 106. To the left of the containers is a configurable icon display 108.

The upper container only displays panels which require the full width of the trader's display area. Each of the panels which can be displayed is assigned one of two priorities. A panel with priority 1 may not be obscured. A panel with priority 2 may be covered or given zero height. In either circumstance the panel data model is maintained when the panel is invisible allowing the data contained to be displayed when they become visible again.

Figure 3:
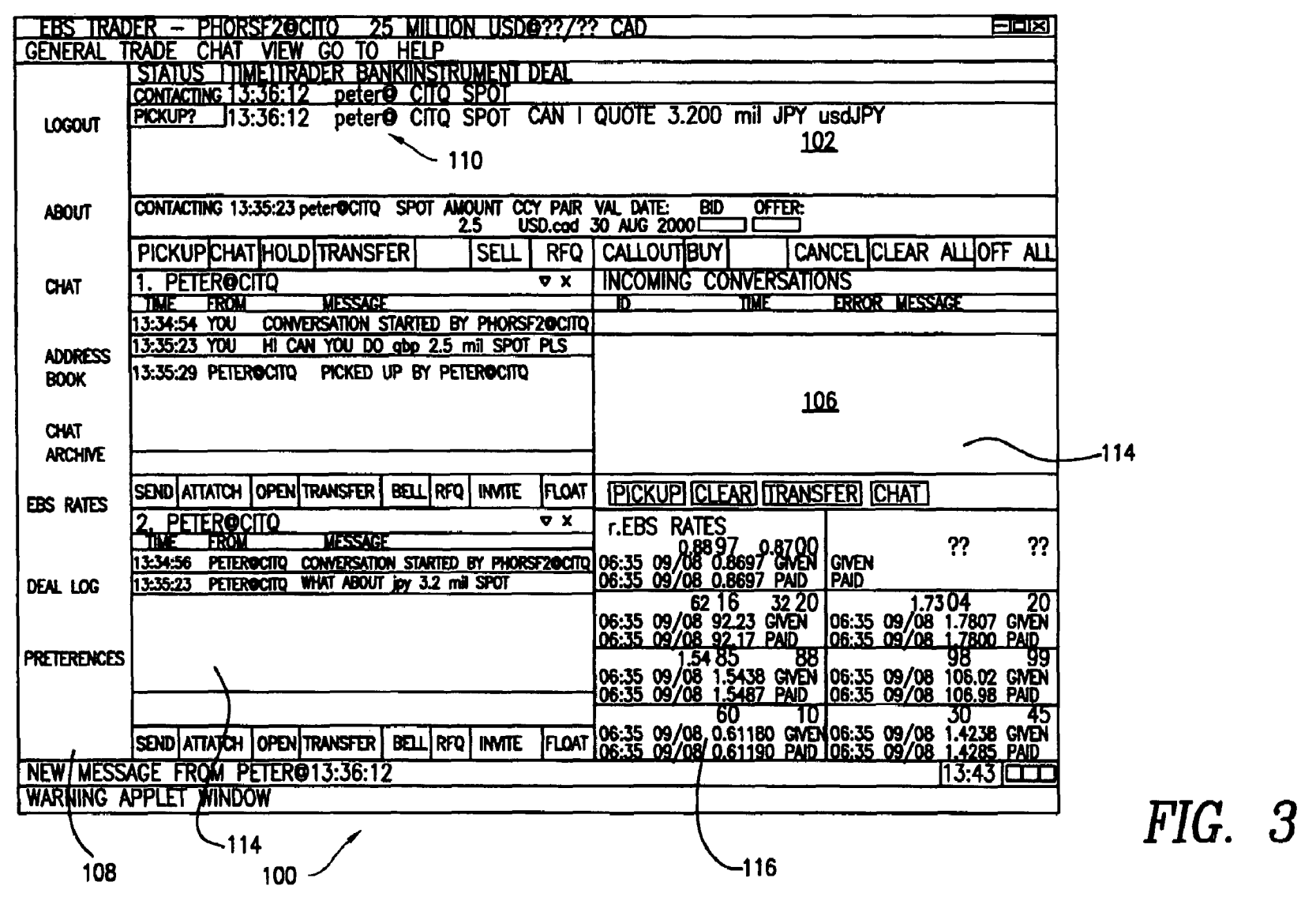

There are three permanent panels each of which have priority 1. These are shown in FIGS. 2 and 3. In the upper container 102 is displayed a deal stack 110, in the lower left container 104 is displayed a conversations area 112 containing a number of conversations in which the trader is participating, and in the lower right container is displayed an incoming conversations panel 114 in which incoming conversational messages are displayed. The messages include conversations in which the trader is not yet participating, and may never, participate.

The optional panels which the trader may choose to display includes:

A Trader Deal panel (not shown), assigned a priority 1 and showing all the deals done by the trader and which may be displayed in either of the two lower containers;

An Overview panel (not shown), assigned a priority 1 and positioned in either of the two lower containers;

A Deal Log panel (not shown) having a priority 2 and showing deals logged by the system and displayed in the upper container 102;

A Rates Area 116 which displays the current trading rates on the system for various currency pairs and which is assigned a priority 2; and A Conversation Archive (not shown) positioned in one of the lower containers and which has a priority 2.

As can be seen from FIG. 3, some of the panels include a button bar along their lower edge. The various functions of the buttons will be discussed in due course. The conversation panels button bars include a float button. Clicking on this button enables the position of the panel to be varied around the screen, even outside the window in which the entire system is displayed. This may be useful, for example, when the user wants to display several optional panels or there are a larger number of conversations open. In the embodiment described up to ten conversations may be ongoing at nay one time, although it will be appreciated that this is an arbitrary number which may be varied.

The incoming conversations panel lists only incoming conversational messages. In the example of FIG. 2, there is a single conversation displayed. At this time, the user is not a party to the conversation. The conversation is displayed under four headings: ID, which is the unique conversation identity number; Time, which is the time at which the conversation was initiated by the counterparty; From which is the identity of the counterparty initiating the conversation; and Message which is the latest message line in the conversation. In the FIG. 2 example, the message "Conversation started by peter@CITQ" has been sent by a trader identified as Peter at the institution having the identifier CITQ. The conversation was initiated at 13.34.54 and has the ID No. 1791.

Underneath the Incoming Conversations panel is a button bar with buttons marked "Pick Up", "Clear", "Transfer" and "Chat". To select a conversation for action the user clicks on the conversations line, which will cause that conversation line to be displayed in a different colour from any other conversations in the panel (in the present case it is the only conversation). If the user clicks on the "Pick Up" button, a Conversation panel is opened in the bottom left container 104 for the selected conversation. At this point the system causes all other parties to whom the conversational message has been sent to display the message "username has joined the conversation". When a party joins a conversation they see that conversation only from the point at which they joined it. Once a first person has picked up an invitation to chat to a deal code, that invitation will be withdrawn from all other parties to which the invitation was sent.

Once a trader picks up a conversation, the conversation is removed from his Incoming Conversations panel.

The "Clear" button, when clicked, causes the selected conversation to be cleared from the display. When a conversation is cleared, the conversation initiator will receive a "Conversation declined by username" in their own Conversations panel.

The "Transfer" button is only enabled if a conversation is bilateral. If clicked, the conversation will be transferred to the trader or Deal Code specified in the Transfer Conversation dialog. Rules may be established defining to whom, if anyone, a given trader may transfer a conversation.

The "Chat" button invokes the launching of a conversation session and also opens a conversation panel in the conversation area. Multiple conversations may be opened with the same person, although a warning box will be displayed to notify the user if he is attempting to open a second or subsequent conversation with the same person.

All the functionality of the button bar may be displayed, alternatively, as a drop down menu to enable operation by keyboard only.

Figures 6, 7:
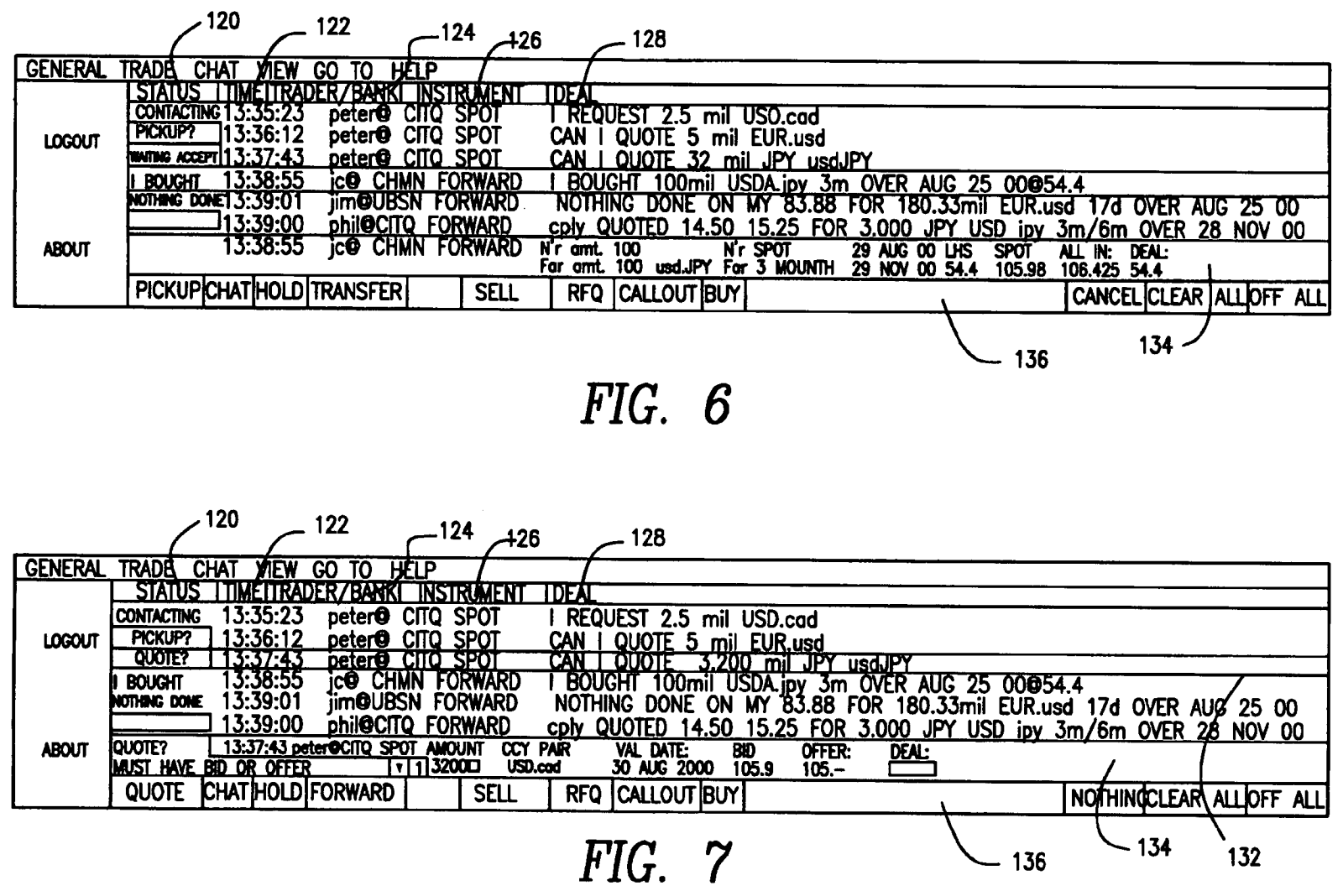

Referring now additionally to FIGS. 4 to 6, the deal stack shows a list of deals in which the trader is involved in and which are pending or completed.

The Deal Stack 130 comprises the following major components:

A Deal List 132, a Deal Detail Panel 134, and a Button Bar 136. The deal list presents information about a deal under four headings: the deal Status 120, the Time 122, the Counterparty (Trader/Bank) 124, the Instrument which is being traded 126 and the Deal 126 that is being made. The information presented in the deal list is independent of the instrument being traded. This is achieved by the use of the deal detail panel and is extremely advantageous as it allows the deal stack to be presented to the user in a very simple manner, with the minimum amount of information and in a manner which is easily assimilated by the trader.

To understand the text of the Deal field 126 it must first be appreciated how deal related information can be put into the system and how the system understands that information as relating to a deal. Deal information may be submitted to the system in one of two ways: direct deal input or parsing of conversations. Parsing of conversations will be discussed in greater detail later. At this stage it is sufficient to appreciate that parsing involves the system analysing conversational messages to determine whether they contain any deal related content. If they do, then the deal is displayed in the deal list.

A deal is commenced by a "Request For a Quote" (RFQ) input into the system by a trader. An RFQ is an indication by a trader that he is interested in trading. The first line of the deal list in FIG. 2 shows an RFQ. Here, the trader has put a request out to the market to trade $2.5 Million in the US$/Canadian dollar market. At this stage no bid or offer prices are given and there is no indication whether trader wishes to but or sell. The RFQ could have been input into the system as a conversational message or by the trader making a direct input, in which cases he hits the RFQ button in the deal button bar. This will display a panel asking for the instrument, the currency pair and the amount.

Thus a deal may be initiated either by the entry into the system of a direct quote request or by the detection of a quote request by the parsing of conversations. For convenience this may be referred to as an indirect quote request.

When an RFQ is received or detected, the systems determines the text that will be displayed in the deal list. This will either be a transliteration of the direct RFQ or a representation of the parsed, indirect RFQ.

A number of deal statuses are defined for each instrument. Each of these has an associated status string which is displayed in the Status field, a deal string which is the text displayed in the deal field and an understood description.

Some examples of deal statuses for F/X Spot are as follows:

| Taker | Maker | Description |
|---|---|---|
| Pre Submit-Taker | | RFQ is being transmitted to server. |
| Pre Pickup-Taker | Pre Pickup-Maker | RFQ has reached maker's screen. |
| Pre Pickup-Taker | Pre Pickup To Deal Code-Maker | RFQ sent to a Deal Code has reached a member of the Deal Code's screen. |
| Pre Quote-Taker | Pre Quote-Maker | Maker has picked up |
| Pre BuySell-Taker | Pre BuySell-Maker | Maker has submitted quote |
| Pre Re-quote-Taker | Pre Re-quote-Maker | Maker has interrupted a quote from "Pre BuySell-Maker" |
| Terminal Statuses | | |
| Sold-Taker | Bought-Maker | Taker has bought |
| Bought-Taker | Sold-Maker | Taker has sold |
| No Traders Available-Taker | | RFQ to deal code where no traders are logged in |
| Taker Cancelled Pre Submit-Taker | | Taker has cancelled from "Pre Submit-Taker" |
| Taker Cancelled Pre Pickup-Taker | Taker Cancelled Pre Pickup-Maker | Taker has cancelled from "Pre Pickup-Taker" |
| Taker Cancelled Pre Quote-Taker | Taker Cancelled Pre Quote-Maker | Taker has cancelled from "Pre Quote-Taker" |
| Maker Cancelled Pre Pickup-Taker | Maker Cancelled Pre Pickup-Maker | Maker cancelled from "Pre Pickup-Maker" |
| Maker Cancelled Pre Quote-Taker | Maker Cancelled Pre Quote-Maker | Maker cancelled from "Pre Quote-Maker" |
| Taker Cancelled Pre BuySell-Taker | Taker Cancelled Pre BuySell-Maker | Taker cancelled from "Pre BuySell-Taker"? |

The Deal Strings and Status Strings associated with some of the above are as follows: It should be appreciated that the deal string is the conversational text which is substituted by the system for the actual conversation entered by the trader or the substituted when the trader enters deal information either using the button bar on the deal stack or equivalent keyboard menus.

| Status | Status String | Deal String |
|---|---|---|
| Pre submit-Taker | Submitting | I request ~AMT~~CCYPAIR~ |
| Pre pickup-Taker | Contacting | I request ~AMT~~CCYPAIR~ |
| Pre Pickup-Maker | Pickup? | Can I quote ~AMT~~CCYPAIR~? |
| Pre Pickup-Taker ~AMT~~CCYPAIR~ | Contacting | I request |
| Pre Pick-up to Deal Code Maker | Pickup? | Can I quote ~AMT~~CCYPAIR~? |
| Pre Quote-Taker | Accepted | Cpty quoting my ~AMT~~CCYPAIR~ |
| Pre Quote-Maker | Quote? | Can I quote ~AMT~~CCYPAIR~? |
| Pre BuySell-Taker | Buy/Sell? | Cpty quoted ~BIDOFR~ for ~AMT~~CCY PAIR~ |
| Pre BuySell-Maker | Waiting Accept | I quoted ~BIDOFR~ for ~AMT~ ~CCY PAIR~ |
| Pre Requote-Taker | Re-quoting | I request ~AMY ~CCYPAIR~ |
| Pre Requote-Maker | Re-quote? | Can I quote ~AMT~~CCYPAIR~? |
| Sold-Taker | I sell | I sell at ~AMT~ ~CCYPAIR~@~BID~ |
| Bought-Maker | I buy | I sell at ~AMT~~CCYPAIR~@~OFR~ |
| Bought-Taker | I buy | I buy at ~AMT~ ~CCYPAIR~@~BID~ |

-continued

| Status | Status String | Deal String |
|---|---|---|
| Sold-Maker | I sell | I buy at ~AMT~ ~CCYPAIR~@~OFR~ |

The following shall be the deal statuses where the instrument is a Forward deal:

| Taker | Maker | Description |
|---|---|---|
| Pre Pickup-Taker | | RFQ is being transmitted to server. |
| Pre Pickup-Taker | Pre Pickup-Maker | RFQ has reached maker's screen. |
| Pre Pickup-Taker | Pre Pickup To Deal Code-Maker | RFQ sent to a Deal Code has reached a member of the Deal Code's screen. |
| Pre Quote-Taker | Pre Quote-Maker | Maker has picked up |
| Pre BuySell-Taker | Pre BuySell-Maker | Maker has submitted quote |
| Pre Re-quote-Taker | Pre Re-quote-Maker | Maker has interrupted a quote from "Pre BuySell-Maker" |
| S/B Pre Rate-Taker | B/S Pre Rate-Maker | Taker has Sold/Bought and is waiting for Taker to enter spot rate |
| B/S Pre Rate-Taker | S/B Pre Rate-Maker | Taker has Bought/Sold or Queried the Spot Rate and is waiting for Taker to enter spot rate |
| S/B Pre Confirm-Taker | B/S Pre Confirm-Maker | Taker has Sold/Bought and Maker has entered spot rate |
| B/S Pre Confirm-Taker | S/B Pre Confirm-Maker | Taker has Bought/Sold and Maker has entered spot rate |
| S/B Pre Rate 2-Taker | B/S Pre Rate 2-Maker | Taker has Sold/Bought, queried the Spot Rate and is waiting for Taker to enter a spot rate a second time |
| B/S Pre Rate 2-Taker | S/B Pre Rate 2-Maker | Taker has Bought/Sold, queried the Spot Rate and is waiting for Taker to enter a spot rate a second time |
| S/B Pre Confirm 2-Taker | B/S Pre Confirm 2-Maker | Taker has Sold/Bought and Maker has entered spot rate a second time |
| B/S Pre Confirm 2-Taker | S/B Pre Confirm 2-Maker | Taker has Bought/Sold and Maker has entered spot rate a second time |
| Terminal Statuses | | |
| Sold/Bought-Taker | Bought/Sold-Maker | Taker has Sold/Bought and Confirmed spot rate |
| Bought/Sold-Taker | Sold/Bought-Maker | Taker has Bought/Sold and Confirmed spot rate |
| No Traders Available-Taker | | RFQ to deal code where no traders are logged in |
| Taker Cancelled Pre Submit-Taker | Taker Cancelled Pre Submit-Maker | Taker has cancelled from "Pre Submit-Taker" |
| Taker Cancelled Pre Pickup-Taker | Taker Cancelled Pre Pickup-Maker | Taker has cancelled from "Pre Pickup-Taker" |
| Taker Cancelled Pre Quote-Taker | Taker Cancelled Pre Quote-Maker | Taker has cancelled from "Pre Quote-Taker" |
| Maker Cancelled Pre Pickup-Taker | Maker Cancelled Pre Pickup-Maker | Maker cancelled from "Pre Pickup-Maker" |
| Maker Cancelled Pre Quote-Taker | Maker Cancelled Pre Quote-Maker | Maker cancelled from "Pre Quote-Maker" |
| Taker Cancelled Pre BuySell-Taker | Taker Cancelled Pre BuySell-Maker | Taker cancelled from "Pre BuySell-Taker" |
| Maker Cancelled S/B Pre Rate 2-Taker | Maker Cancelled B/S Pre Rate 2-Maker | Maker cancelled from "S/B Pre Rate 2-Taker" |
| Maker Cancelled B/S Pre Rate 2-Taker | Maker Cancelled S/B Pre Rate 2-Maker | Maker cancelled from "B/S Pre Rate 2-Taker" |
| Taker Cancelled S/B Pre Confirm 2-Taker | Taker Cancelled B/S Pre Confirm 2-Maker | Taker cancelled from "S/B Pre Confirm 2-Taker" |
| Taker Cancelled B/S Pre Confirm 2-Taker | Taker Cancelled S/B Pre Confirm 2-Maker | Taker cancelled from "B/S Pre Confirm 2-Taker" |

For every deal in the deal stack there is a corresponding conversation session. In some cases, the RFQ will have originated from a conversation. In others it will have not. In the latter case, a direct quote, a conversation is created but a conversation panel is only opened, that is, the conversation is exposed, if specifically requested by the trader.

Thus, whenever the system performs an action on a deal in response to a Trader action, a message line shall be included in the conversation session indicating the nature of this action. This message line shall be in a form where if the Trader had exposed the underlying conversation and typed in the message text it shall parse and produce the same action on the deal. The Message shall be in a form that reflects the best conversational practice from the point of view of parsing.

The Deal List displays all live RFQs that the trader is involved with. He may see other RFQs if the appropriate options are set. The Trader shall have the option of clearing completed deals automatically as they are completed. The Trader shall have the option of seeing all RFQs that have been auto-forwarded from his account. Auto-forwarded RFQs shall be cleared from the Deal List by the Clear function.

As mentioned above, the Deal List is wholly independent of the instrument being traded. Thus, the Deal List only displays five columns: Status, Time, Trader/Bank, Instrument, and Deal. The Deal column contains an instrument/status specific string that is generated by the system to describe the deal.

To balance the independence of the deal list, the Deal Detail Panel at the bottom of the Deal List has an instrument specific format and reflects full details of the deal that is currently selected in the list.

When a new Deal is added to the Deal List it is inserted at the bottom of the list regardless of the currently selected sort order (a re-sort is necessary to position the deal correctly in the sort order). When a deal is added to the Deal List, as a result of the trader's actions (RFQ or Chat), the item last added to the table becomes the selected item. The list is scrolled so that the selected item is visible to the trader. If the new deal is initiated by a Counterparty the selected deal does not change. If focus is in the Deal List, the currently selected item does not change when a new deal is added to the list. If a new deal is added to the Deal Stack such that the Deal Stack would have to be scrolled to view the deal, then the scrollbar's background flashes, for example red, until the deal is made visible by scrolling.

The Deal Detail panel may contain buttons and other controls that relate to instrument specific functionality which is not available through the standard Deal Stack buttons. When a deal is in a modifiable state the modification is done via edit controls in the Deal Detail panel. These potentially modifiable fields shall have a different colour, for example, cyan, background to the rest of the deal Detail panel. The deal detail panel itself may be a different colour, for example yellow, to the deal list. When the fields are editable they are distinguished, for example by a white background with a black border.

The Format of the Deal Detail panel is specific to the instrument of the deal. Every implementation of the panel has certain common fields and controls that are always in the same place: Status, Time, Trader/Bank, Instrument & Error/Warning Combo Box. FIGS. 4, 5, 7 and 8 illustrate the Deal Detail panel for F/X Spot and various stages of a deal and FIG. 6 illustrates the Deal Detail panel for F/X forwards at a certain stage of the deal process.

Thus, the Deal Detail panel includes all the information in the Deal list except that instead of the deal string it contains the information which, when entered and then parsed, will result in that deal string. Thus, for F/X Spot, the Deal Detail panel includes Amount, Currency Pair, Value Date, Bid and Offer prices and Dealt. In FIG. 4, the deal detail panel is shown for the first deal in the stack. This is a deal which has only just commenced and where the RFQ has been issued. As there are not yet any bid or offer prices, the only fields that are populated are the amount, the currency pair and the value date. When parsed this results in "I request 2,5 Mil USD.cad".

In FIG. 5, the deal highlighted is the third in the list and, the status of the deal is pre quote—maker, indicating that the maker has picked up the takers quote and is quoting bid and offer prices for 3,200 million Japanese Yen. As the amount and the prices can both be edited, they appear in the Deal Detail panel as black text on a white background.

FIG. 6 shows the Deal Detail panel for a Forward deal. Here, the panel lists both near and far amounts, the currency, the nature of both the near and far deals, their value dates, the left and right hand sides, spot amounts, all in amounts and deal amounts. In the example shown, the panel relates to the fourth deal in the list which is a completed deal. Thus, all the fields in the deal detail panel are populated and done are modifiable.

In order that traders can be notified of unallowable entries or mistakes, there is an Error/Warning combo box in the lower left side of the detail panel. This combo box shall have an entry in its drop down list for every error or warning condition associated with the deal. When an error or warning is selected in the combo box, the field to which the error or warning pertains will be highlighted in a very obvious manner, for example with a red (error) or orange background (warning). Errors and warnings are listed in the order of their priority. This combo box has an associated label to its right which indicates the number of errors or warnings that the combo box contains. When an alarm or warning condition is changed in the list, the highest priority item is the selected item.

FIG. 7 shows an example of the error box. Here, the highlighted deal is the third in the deal list. This requires both an amount and bid and offer prices. The trader has not entered bid and offer prices and the error box shows that a bid or offer price is required. In addition, the Quote? Status string is highlighted in red and the bid and offer fields which would normally be shown white.

The presence of an error in the combo box shall disable keys and menu items, which allow the deal to proceed forwards, until the error condition is corrected.

FIG. 8 shows the deal detail panel for a deal that is waiting acceptance. Here, the maker has submitted a quote and the deal is now waiting for and acceptance or refusal from the taker. Although not clear from the figures, the amount, bid and offer details are highlighted to indicate that they can be modified.

The Status, Time, Trader/Bank, and Instrument column entries are positioned on the Deal Detail panel exactly beneath their respective columns in the Deal List. If the columns are resized, their relative positions shall also change. The Error/Warning combo box and its associated count label shall automatically have its width set to that of the Status, Time, Trader/Bank and Instrument columns combined. The instrument specific fields beneath the Deal column shall resize and position themselves proportionally to the width of the Deal column.

The instrument specific fields will now be described in more detail for the two example instruments. It is to be understood that the invention is applicable to any instruments and the fields will vary from instrument to instrument.

The amount field is initially read only and displays the amount of the RFQ in millions. When the deal reaches the pre quote-maker stage (FIG. 5), the field becomes editable.

The "on" currency field is to the right of the amount field and is the currency in which the RFQ is expressed. If it is not the base currency it is displayed, if it is not, then it is not displayed. It is not editable until the pre quote—maker stage at which point it becomes editable The currency pair field simply shows the currency pair being traded.

The value date indicates the value date for the deal and cannot be change by the parties. It is a regular date for the instrument unless indicated otherwise, for example by an asterisk.

The bid and quote fields display bids and quotes where these exist. They are read only except in the pre quote—maker and Pre re-quote maker stages of the deal when they can be edited, as described in relation to FIG. 5. If a big figure, that is the most significant digits of the price is available from the market feed into the trading system, that figure is used. If an arbitrage situation is present the market feed rate, the big figure from the system best offer is used. This can be seen in the system rates panel which the user may choose to display.

The final field is the dealt price field which shows the price at which the deal was done. As can be seen from FIG. 9, this reflects the side (but or sell) on which the deal was done. In FIG. 9, the dealt price is the bid price.

The forwards specific fields shown in the deal detail panel are as follows;

Near and Far Amounts. These function in the same manner as the Amount field in the Spot example.

On Currency. This functions in the same manner as the Amount field in the Spot example.

Currency Pair. This functions in the same manner as the Amount field in the Spot example.

Near and Far Periods. If these periods conform to standard periods, for example one month, they will be shown as such. If they do not, they will be shown as broken.

Near and Far Dates. This shows the near and far value dates.

Left and Right Hand Side Prices. Where a LHS or a RHS exists it will be displayed in this field. It is a read only field except then the deal status is in pre quote—maker or pre requote—maker status. When in edit mode this field is pre-populated with the market rate, if available for the bid. If the LHS or the RHS is left blank by the trader, then a one sided price without a bid or offer, respectively, is quoted Premium and Discount. If the LHS is less than the RHS, the system assumes that the base currency is at a premium to the local currency. If the trader does not enter minuses and the RHS is less than the LHS, the system assumes that the base currency is at a discount to the local currency. Where a discount is detected, the system inserts "−" signs before each value and displays the bid and offer with them. off A trader can enter negative amounts for a discount.

Spot Rate. Where a spot rate exists, the Spot Rate Bid field displays it. It is a read only field except when the deal is in I B/S-Rate or I S/B-Rate (I sell/buy or buy/sell at a given rate) status. In edit mode, the field is pre-populated with a middle rate between the bid and offer market rates.

Spot Button. As can be seen from FIG. 10, the deal detail panel includes a Spot button on which the user can click to display a spot rate query dialog window. The spot button is only visible to the trader when the deal is in I B/S—Confirm or I S/B—Confirm stages. The spot rate query dialog window includes an edit box, allowing the trader to enter text of up to 30 characters having been pre-populated with the text "Check Rate". This enables the trader to check the spot rate before committing to a deal. As can be seen from FIG. 10, the dialog box includes send and cancel buttons. The send button closes the box, transmits the message and changes the deal status to I S/B awaiting rate or I B/S awaiting rate.

Figures 10, 11:
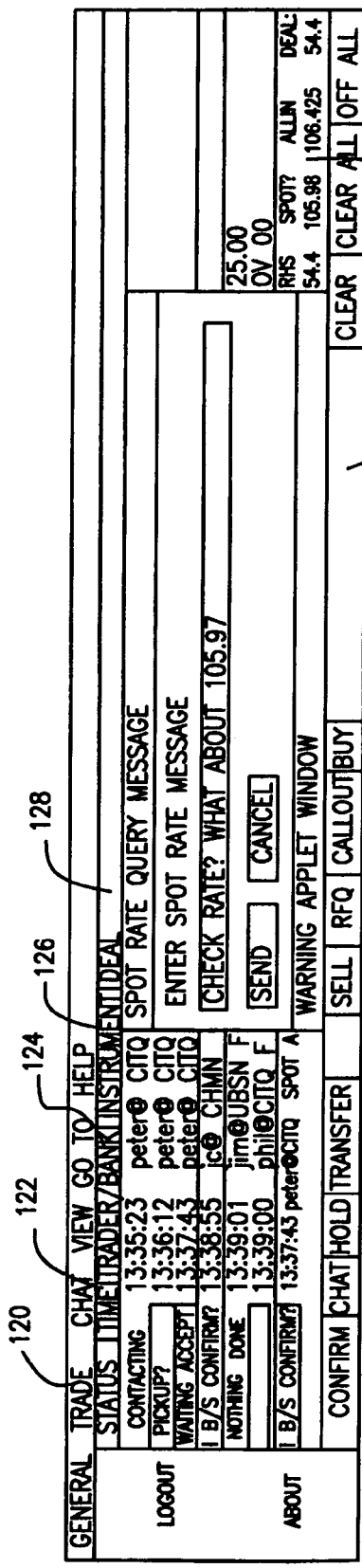
FIG. 10 shows the deal stack with the deal detail panel showing a forward deal with a Spot Rate Query message.
FIG. 11 shows how the Spot rate query message of FIG. 10 appears at the counterparty's deal detail panel as a warning message.

When a maker deal receives a Spot Rate Query message against it the message appears as a warning in the error/warning combo box. This is illustrated in FIG. 11.

All In Rate. This field is read only and, when the maker has submitted a spot rate, reflects the aggregate of the dealt rate and the spot rate. For Overnight or Tomorrow-Next periods, the sign of the forward bid or offer is reversed to calculate the all in rate.

Dealt Rate. This is the final field in the deal detail panel and is a read only field. When the taker has Buy/Sell or Sell/Buy, the field reflects the price from the side of the market dealt on.

Outrights. The fields for the deal detail panel when the instruments is an outright are not shown as they are the same as for a spot deal referred to above.

The deal column displays different status dependent strings for each instrument. Some of these, for spot, were discussed earlier. The strings are not hard coded into the system but are configurable centrally by the system administrator. Th traders have no control over the strings. As seen before, the status definitions comprise tokens, delimited by tildes (~) representing the underlying values for the deal.

The tokens for spot and outrights are as follows:

| Token | Value | Format |
|---|---|---|
| ~TIME~ | Deal Time | "hh:mm:ss" |
| ~TRADER~ | Trader | As Deal Stack |
| ~BANK~ | Cpty bank | |
| ~INST~ | Instrument | As per deal stack |
| ~AMT~ | Amount | "9,999.9" + " " + ONCCY (if not base ccy) + "mil" |
| ~CCYPAIR~ | Ccy pair | BASE.local (On currency shall be in upper case.) |
| ~VALDAT~ | Value Date | "dd mmm yy" |
| ~BID~ | Bid | As per the Ccy pair specific format |
| ~OFR~ | Offer | As per the Ccy pair specific format |
| ~BIDOFR~ | Bid and Offer | If Bid & Offer exist: Bid-Offer If Bid only: Bid If Offer only: Offer |

-continued

| Token | Value | Format |
|---|---|---|
| | | (Bid & Offer As per the Ccy pair specific format) |
| ~DEALT~ | Dealt Price | As per the Ccy pair specific format |

The tokens for forwards deals are as follows:

| Token | Value | Format |
|---|---|---|
| ~TIME~ | Deal Time | "hh:mm:ss" |
| ~TRADER~ | Trader | As Deal Stack |
| ~BANK~ | Cpty bank | |
| ~INST~ | Instrument | As per deal stack |
| ~AMT~ | Amount | "9,999.9" + " " + ONCCY (if not base ccy) + "mil" |
| ~HEDGE~ | Spot Hedge | "9,999.9" + " " + ONCCY (if not base ccy) + "mil" |
| ~CCYPAIR~ | Ccy pair | BASE.local (On currency shall be in upper case.) |
| ~NEAR~ | Near Period or Date | As per deal detail panel |
| ~FAR~ | Far Period or Date | As per deal detail panel |
| ~VALDAT~ | Value Date | "dd mmm yy" |
| ~BID~ | LHS Points | As per the Ccy pair specific format |
| ~OFR~ | RHS Points | As per the Ccy pair specific format |
| ~BIDOFR~ | LHS and RHS Points | If LHS & RHS exist: LHS-RHS If LHS only: LHS If RHS only: RHS (LHS & RHS As per the Ccy pair specific format) |
| ~SPOT~ | Spot Rate | As per the Ccy pair specific format |
| ~ALLIN~ | All In rate | As per the Ccy pair specific format |
| ~DEALT~ | Dealt points | As per the Ccy pair specific format |

The third part of the deal stack is the button bar which is beneath the deal list and the deal detail panel. The button bar gives the trader various options for progressing or cancelling a deal. The button bar is specific to each deal. That is, the button bar displayed will depend on the deal which is selected in the deal stack. Some options will not be available to a trader at certain stages of the deal as will be explained.

Referring back to FIGS. 4 to 7, it will be seen that the button bar differs from figure to figure depending on the status of the deal highlighted in the deal list. In some cases, buttons as not displayed in bold, indicating that they are not available. In some cases, buttons are substituted. As examples of the latter, the pickup button in FIG. 4 is replaced by a quote button in FIG. 5. The cancel button of FIG. 4 is replaced by the Nothing button in FIG. 5.

The button bar provides the trader with an alternative, but equally valid method of trading to conversational exchanges with counterarties using the conversation panels. The system operates by converting deal instructions entered via the buttons into parsed text in the same manner as it parses conversational text to produce parsed text for the deal list deal field.

The buttons available to traders are as follows:

Pickup eg FIG. 4). This enable a trader to "pickup" an RFQ entered into the system by a taker. As a result the pickup button is only available to the maker and then only when the deal is in the Pre Pickup—Maker status. By pressing pickup the maker indicates that he is interested in quoting on the RFQ. The RFQ may be sent by the take to one or a number of traders. If it has been sent a deal code (that is a trading floor or floors), on receipt of a pick up, the RFQ will be removed from the deal lists of all other recipients.

Quote (eg FIG. 5). This enables a trader to enter a quote and so is only enabled on the maker side when a deal is in the pre quote—maker status. The action of the quote will vary from instrument. For a spot or outright deal, the system transmits to the taker the maker's bid and/or offer together with an amount. For a forward deal the system transmits to the taker the maker's LHS points and/or RHS points together with near and far amounts.

The first button in the button bar combines all default actions. For the spot example, the button will revert to pickup but be grayed out for deal statuses other than those mentioned above. For forwards, more options are available. When the deal is in the status S/B or B/S Pre Rate—Maker or S/B or B/S Pre Rate 2—Taker, the button will be displayed as a Rate Button (not shown) enabling the maker to transmit to the system the maker's spot rate. When the forward deal is in the status S/B or B/S Pre Confirm—Taker or S/B or B/S Preconfirm 2—Taker, the button is displayed as a spot button which allows the Taker to accept the maker's proposed spot rate.

Chat. This button, which is only available when a single deal is selected causes the conversational panel opened for the deal to be displayed in the bottom left container. Even if the deal has been conducted in a direct not conversational form, the system will show a deparsed version of conversation that would have led to that deal state. This is possible as each deal has a conversation with it regardless of how the deal is being conducted, whether by conversation or direct entry using the button bars. The trader can switch to conversation at any time to continue the deal. The system will parse that conversation and will not distinguish between direct and indirect deal entry methods. In this respect the system is transparent.

Hold. This button is only enabled when a selected deal is in Pre Quote—Maker status. It causes the selected deal to be put back into Pre Pickup—Taker and Pre Pickup—Maker statuses and, if the original RFQ was sent to a deal code, causes the RFQ again to be displayed to all those parties.

Transfer. This button is only enabled when selected deals are in Pre Quote Maker Status. It enables a trader to transfer the deal to another trader within the limits of a preset authority. Pressing the button will cause a dialog box to be displayed into which the trader can enter the code of the trader to which the deal is to be transferred. A message to this effect is displayed on the originator's deal stack so he knows he is now dealing with a different counterparty.

Sell. This button is only enable for instruments such as Spot or Outrights. It provides a means for a taker to Sell at the Maker's bid price and so is only enable in the Pre BuySell status when there is a bid from the maker.

RFQ. This button enables a Maker to put out a request for a quote to the market. When this button is pressed, the maker has to supply the amount and the currency pair. On receipt of the RFQ by the system, a new conversation is associated with the deal.

The RFQ button converts to the caption FIX when the RFQ has been initiated by conversational parsing on the Taker side and is awaiting confirmation for accuracy by the taker Callout. This button enables a trader to initiate a callout.

Buy. This button is only enabled when a selected deal for an instrument such as a Spot or an Outright is in the Pre Buy/Sell—Taker status where there is an offer from the maker. By hitting the button, the taker indicates to the system that he wishes to buy at the maker's offer price.

Cancel. This is a multifunction button whose caption will depend on the deal status and the instrument being traded in the selected deal. It is used for all negative functions. The functions will vary from instrument to instrument but for Spot are as follows:

| Caption/Action | Taker Status | Maker Status |
|---|---|---|
| Cancel | Pre Submit-Taker<br>Pre Pickup-Taker<br>Pre Quote-Taker<br>Pre Re-quote-Taker | |
| Nothing | Pre BuySell-Taker | Pre Pickup-Maker<br>Pre Pickup To Deal Code-Make<br>Pre Quote-Maker<br>Pre Re-quote-Maker |
| Interrupt | | Pre BuySell-Maker |
| Clear | Any Deal in Terminal Status (see section 4.1.3-"Terminal Statuses") | Any Deal in terminal Status (see section 4.1.3-"Terminal Statuses") |
| Clear (grayed) | If none of the above apply | If none of the above apply |

| Caption/Action | Taker Status | Maker Status |
|---|---|---|
| Cancel | Pre Submit - Taker<br>Pre Pickup - Taker<br>Pre Quote - Taker<br>Pre Re-quote - Taker | |
| Nothing | Pre BuySell - Taker<br>S/B Pre Confirm 2 - Taker<br>B/S Pre Confirm 2 - Taker<br>S/B Pre Rate 2 - Taker<br>B/S Pre Rate 2 - Taker | Pre Pickup - Maker<br>Pre Pickup To Deal Code - Maker<br>Pre Quote - Maker<br>Pre Re-quote - Maker<br>B/S Pre Rate 2 - Maker<br>S/B Pre Rate 2 - Maker |
| Interrupt | | Pre BuySell - Maker |
| Clear | Any Deal in terminal Status (see section 4.1.3 - "Terminal Statuses") | Any Deal in terminal Status (see section 4.1.3 - "Terminal Statuses") |
| Clear (grayed) | If none of the above apply | If none of the above apply |

Of the various actions mentioned above, the cancel action cancels the existing deal stage, reverting it to a preceding deal stage. The Nothing action indicates that the taker is not interested in a proposed deal. The interrupt action removes the deal from the deal stack and is only enabled when a deal reaches a terminal status, that is it is a completed deal.

Clear all. This button clears all eligible deals from the deal stack.

Off All. This button withdraws all deals that are in an appropriate form from the market.

The foregoing section has described the trading actions that are available to a trader from the button bar. It is desirable that the trader can perform all available functions without using a pointing device such as a mouse. Accordingly, the system provides a set up pop up menus which provide the same functionality as the button bar but which can all be invoked from the keyboard. Each function can be invoked by the same keyboard character in each menu. Examples of the characters that can be assigned to functions are:

| Mnemonic | Action |
| --- | --- |
| A | Clear All |
| B | Add Trader to Contact Book |
| C | Chat |
| F | Fix |
| H | Hold |
| L | Add Trader to Callout List |
| M | Contact Management |
| O | Off All |
| P | Pickup |
| Q | Quote |
| R | RFQ |
| S | Sell |
| T | Transfer |
| U | Callout |
| X | Cancel, Nothing, Interrupt & Clear |
| Y | Spot Rate Query |
| Z | Sort |

An example of a possible menu for a deal status is as follows:

| Status | Menu | |
| --- | --- | --- |
| "Pre Pickup-Taker" (No Default) | c. | Chat F4 |
| | f. | Fix |
| | t. | Transfer |
| | x. | Cancel Esc |
| | a. | Clear All F11 (Only if deals to clear) |
| | o. | Off All F12 |
| | m. | Contact Management (incoming only) |
| | --- | (separator) |
| | r. | RFQ F6 |
| | u. | Callout F7 |
| | z. | Sort |

Parsing

The description above has been concerned with the traders interface with the dealing system. It has been mentioned that deals can be entered into the system directly through the deal stack button bar or equivalent keyboard strokes, or that deals can be entered conversationally, which conversation is parsed by the system to extract the deal related information. The next section examines the parsing mechanism.

Parsing within trading systems is, itself, known. Parsing is used in the Reuters Dealing 2000/1 system referred to in the introduction. However, in that system, all deal transactions are through conversation. The trader does not have the option of using direct deal entry as described above. As a result there is no requirements for the system to be able to deparse deal information. Because of this, the parsing requirements of the present system differ markedly from those of the prior art. The following description will consider the foreign exchange markets and, in particular, the three instruments discussed above: FX Spot, FX Outrights and FX Futures.

A general FX terminology module provides an indication of the common terminology used by dealers to deal FX via the Chat panel on the Trader platform.

The system monitors all conversations conducted via the chat panel and interprets text from the conversations into a fixed format within the deal stack, thus standardising the deal details and enabling the system to construct a formal deal ticket for each FX deal.

The system can distinguish the important terms within a conversation that relate to the completion of the deal. This includes terms related to requesting a quote, responding with a quote, confirmation of buy or sell, and any notice of special settlement instructions.

The system can distinguish terms within a conversation that could lead to ambiguity as to deal details or whether a deal is in progress at all. For instance, dealers may be discussing a previous trade or providing indicative quotes internally.

The system can ignore terms that are not pertinent to the completion of a deal. That is, friendly formalities such as discussions regarding the weather or particular news stories, will be overlooked by the system, no matter at what point in the deal process, they occur.

Functional Components of the General FX Terminology Requirements are:
 Chat Terminology—Common Deal Terms
 Chat Terminology—Negative Terms
 Chat Terminology—Unrecognized Terms
The interaction between components is:
 Chat Terminology—Common Deal Terms provides the list of terms and variables that are directly pertinent to an FX deal being completed and should be parsed by the system.
 Chat Terminology—Negative Terms provides the list of negative terms that the system should be aware of that would indicate that preceding/proceeding terms/phrases are not pertinent to a deal in progress.
 Chat-Terminology—Unrecognized Terms describes how the system should treat terms/phrases it does not recognize within the chat conversation.

Chat Terminology—Common Deal Terms

The system can recognize all common phrases and terms used within a conversation that are pertinent to the completion of the deal. Specific terms within the conversation provide values for the variables that are necessary for a deal to be concluded. The system must be able to pick up these terms and to deliver the data to the corresponding fields within the deal stack.

Dealers use a variety of different ways/shortcuts to communicate the same thing within a conversation. The system can pick up on market conventions in relation to the key variables required for the deal stack.

As part of a request for quote, the system permits the user to enter a single ISO currency code 'CurrX' or its pseudonym to represent the currency pair USD/CurrX. For example:
 CHF=USD/CHF
 NZD=NZD/USD
 GBP=GBP/USD
 Cable=GBP/USD
 Peso=USD/MXP the system permits the user to enter a complete currency pair, i.e. reference to both currencies, in the following formats:
 Currency1/currency2
 Currency1 Currency2

Currency1Currency2
Currency1-Currency2

The system permits the user to specify an amount with a label to denote magnitude. For example:
10 mio=10 million
500k=500 thousand
1bio=1 Billion If the user specifies an amount without a label that denotes the magnitude, the system shall interpret the amount as being expressed in millions. For example:
10=10 million
CHF in 20=USD/CHF for 20 million USD
GBP in 500k=GBP/USD for 500,000 GBP The system permits the user to specify a two-way quote in any of the following formats:
bid quote/offer quote
bid quote-offer quote
bid quote offer quote
bid quote*offer quote The user may specify a one-way bid quote in any of the following formats:
Bid quote/-
buy at [Bid quote]
Bid at [Bid quote]

The user may specify a one-way offer quote in any of the following formats:
-/Offer quote
sell at [Offer quote]
Offer at [Offer quote]

The user may confirm a deal with the following terms:
ok
done
confirmed
conf
agreed
agree The system permits the user to cancel a deal using any of the following terms:
Cancel
Canc
Nothing
Nothng
Nthing
Nthng
NT
No Thanks
No thks If the user cancels the deal in the conversation, the system automatically cancels the appropriate deal entry in the Deal Stack Chat Terminology–Negative Terms The system takes into account that dealers on the system may discuss previously completed deals via the chat panel, but are not attempting to complete a deal. The system will recognize terms that indicate that the current conversation in which the dealers are engaged, does not pertain to a deal.

The system does not attempt to parse any variables from the chat panel if the variables are preceded by the following phrases within the same line of input/sentence, that indicate a past event (substitute any characters for . . . ):
. . . did . . . [deal variables]
. . . dealt . . . [deal variables]
. . . completed . . . [deal variables]
. . . made . . . [deal variables]
. . . quoted . . . [deal variables]
. . . bought . . . [deal variables]
. . . sold . . . [deal variables]

Some examples of the incidence of the above terms are as follows:
We did 10 mio EUR ystd—The dealer is referring to a historical deal
We dealt cable in 10 last week—The dealer is referring to a historical deal
I completed the stg deal—The dealer is referring to a historical deal
He made me stg at 67/70—The dealer is referring to a historical quote
I have done a deal for Swiss in 20—The dealer is referring to a historical deal
He quoted 67/70—The dealer is referring to a historical quote If the user has input phrases/terms pertaining to a past event (ref: 2.3.2.1) The system continues its monitoring process of the chat panel immediately after the input has been sent to the counterparty. For example:
We did Eur yesterday
I want 20 CHF today—the dealer first refers to a historical deal, which is ignored by the system based on the rules of 2.3.2.1 above. The second sentence is an RFQ for USD/CHF, 20 million USD that will be parsed by the system.
I did not quote you CHF at 50/47
Its 60/57—The dealer first refers to a historical quote (or a mistaken quote in this case) which is ignored by the system based on the rules of 2.3.2.1 above. The second sentence is a quote for USD/CHF that will be parsed by the system.

Chat Terminology—Unrecognized Terms

The chat panel is used for a variety of casual conversations that have no bearing on the dealing process. The system will ignore all terms that do not conform to requirements of the Deal Use Case.

FX Spot Parsing

The FX Spot module provides the user with the ability to deal the FX Spot instrument type via the Chat panel on the EBS Trader platform.

The Functional Components of the FX Spot Parsing Requirements are the Deal Use Case and the Chat Terminology—Deal Terms. The Deal Use Case describes the process of completing a deal and enables the system to actively 'watch' for particular terms/phrases it is expecting to see within a conversation that are pertinent to an actual deal. Chat Terminology—Deal Terms provides the list of terms and variables that are directly pertinent to a deal being completed and should be parsed by the system.

Deal Use Case

In order to complete an FX spot deal, the following must take place:

An FX Spot request for quote is sent by a taker to his maker(s)

In response, the maker can either: provide a two way quote (bid and offer) in response to the RFQ—this is only if an amount was indicated in the RFQ; provide a one way quote (bid or offer) in response to the RFQ—this is only if an amount as indicated in the RFQ; provide a quote for a particular amount in response to the RFQ; or indicate that he does not want to supply a quote, so no deal takes place.

The taker receives a quote. In response he can either: indicate he wants to buy and confirm the deal; indicate he wants to sell and confirm the deal; or cancel the deal if the taker does not like the quote The deal is now complete.

The system recognizes the stage at which an FX Spot deal is at within the dealing process. The system watches for particular phrases pertinent to the particular stage of the deal process. If no deal is currently in progress within a chat panel, the system monitors the chat panel for indications of a request for quote. In particular, the system watches for the following terms that indicate a request for quote has been initiated within a chat panel conversation:

- An indication of the instrument type (FX Spot)
- An indication of a currency pair
- An indication of an amount
- An indication of the currency of the amount A request for quote includes at least an indication of the currency pair. Some examples are as follows:

- hihi CHF pls—The taker is requesting a quote for USD/CHF
- hi CHF in 10 pls—The taker is requesting a quote for USD/CHF for 10 million USD
- Hihi SPOT STG in 10 pls—The taker is requesting a quote for GBP/USD for 10 million GBP
- Hi frd GBP/EUR pls—the taker is requesting a quote for GBP/EUR
- Welly for 20 pls—the taker is requesting a quote for NZD/USD for 20 million NZD The system parses all variables indicated as part of an RFQ from the conversation to the appropriate field in the Deal stack.

If the system has identified a request for quote, and it has been sent to the maker, the system monitors the chat panel for indications of a response to the request for quote. The system watches for the following terms within the chat panel that indicate a response to the request for quote:

- indication of a bid quote
- indication of an offer quote
- indication of a refusal to quote
- an indication of an amount
- an indication of the currency of the amount A response to a request for quote includes an amount if one is not supplied in the RFQ, together with at least one of the following:

- a bid quote
- an offer quote

OR

- a refusal to quote

Some examples of a response to a request for quote:

- 1.4696/4700—The maker provides a two way quote, bid/offer
- 4696/4700—The maker provides a two way quote bid/offer
- 96/00—the maker provides a two way quote bid/offer
- 56-60 up to 10—the maker provides a two way quote, bid/offer, and an indication of amount, 10 million
- I buy at 60—the maker provides a one-way quote; the offer quote.
- Nothing—Maker refuses to quote The system parses all variables indicated by the maker in the response to a request for quote from the conversation to the appropriate fields in the Deal Stack. A refusal to quote is indicated if the maker inputs this intention into the chat panel or cancels the deal through the deal stack. If the maker refuses to quote, the system shall conclude that the deal has been cancelled. If the maker refuses to quote, the system re-starts its monitoring process and looks for a request for quote within the conversation. The system ensures that the following variables have been parsed from the conversation to the deal stack prior to permitting the taker to indicate his intention to buy or sell:

- The currency pair
- The amount
- The currency of the amount
- A bid and/or an offer If the above variables have not all been successfully parsed to the deal stack, the system requests that the maker input the missing variables prior to indicating his intention to send. For example, the system could raise an alarm. If the system has identified a response to a request for quote, and the response has been sent to the taker, the system monitors the chat panel for a response to the quote.

The system watches for the following terms within the chat panel that indicate a response to the quote:

- an indication to buy at the offer price
- an indication to sell at the bid price
- an indication of a cancellation of the deal A response to a quote includes at least one of the following:

- an indication to buy at the offer price
- an indication to sell at the bid price
- an indication of a cancellation of the deal Some examples of a response to quote are:

- Ok, I buy—the taker is happy with quote and agrees to buy at offer price
- Ok, mine in 10—the taker is happy with quote and agrees to buy at offer price for an amount of 10 million, the amount "10" is ignored by the system, the whole available amount is bought
- Yours—the taker is happy with quote and agrees to sell at the bid price
- Ok I sell .—the taker agrees to sell.
- Nothing thks.—the taker does not like the quote and does not wish to deal A cancellation of the deal indicated if the taker inputs his intention to cancel (he does not like the price) or the taker cancels the deal within the deal stack. If the taker cancels the deal, the system shall re-start its monitoring process and look for a request for quote within the conversation. If the system has identified a response to quote the system confirms the deal in the deal stack and re-starts its monitoring process and look for a request for quote within the conversation.

Chat Terminology—Deal Terms

The system can recognize all phrases and terms used within a conversation that are pertinent to the completion of the deal.

Specific terms within the conversation provide values for the variables that are necessary for a deal to be concluded. The system is able to pick up these terms and to deliver the data to the corresponding fields within the deal stack.

Dealers use a variety of different ways/shortcuts to communicate the same thing within a conversation. The system can pick up on market conventions in relation to the key variables required for the deal stack.

As part of an request for quote, the system permits the user to enter the term 'spot' to indicate that the deal is a FX Spot deal. For example:
SPOT Swiss please=FX Spot deal for USD/CHF As part of the request for quote, the system permits the user to specify a currency pair with or without an amount, to indicate that the deal is a FX Spot deal. For example:
Stg pls=FX Spot deal for GBP/USD
EUR pls=FX Spot deal for EUR/USD
Eur in 10 pls=FX Spot deal for EUR/USD, amount is 10 million EUR
CHF for 20=FX Spot deal for USD/CHF, amount is 20 million USD The system permits the user to specify an amount of currency to buy or sell. For example:
10 mio GBP against USD pls=USD/GBP, 10 million GBP
Eur pls, 10 million US=EUR/USD, 10 million USD If the user does not specifically indicate the currency of the amount, the system shall interpret the amount to represent the amount in the base currency of the currency pair. For example:
eur in 10 pls=EUR/USD 10 million EUR
chf for 10=USD/CHF, 10 million USD
50 mio Welly pls=NZD/USD, 50 million NZD The system permits the user to enter the big figure only once as part of the first part of the quote, be it bid or offer. For example:
1.4567/70⇒bid quote=1.4567, offer quote=1.4570
121.43/53⇒bid quote=121.43, offer quote=121.43

The system permits the user to enter a quote without the big figure, i.e. only the pips of the quote. For example:
67/70⇒GBP/USD quote, bid quote=1.4567, offer quote=1.4570
43/53⇒GBP/JPY quote, bid quote=121.43, offer quote=121.53

The system warns the user if there is no big figure available. The system permits the user to indicate his preference to buy the stated amount of currency by using the following terms:
Buy
Mine
M
B
Take
T
At [Offer Price]
[Offer Price]

The system permits the user to indicate his preference to sell the stated amount of currency by using the following terms:
sell
Yours
Y
S
give
G
At [Bid Price]
[Bid Price]

The system permits the taker to indicate his intention to buy or sell. For example:
I sell CHF=User sells previously indicated amount of CHF
Y=User sells previously indicated amount in previously indicated currency In addition, the system permits the maker to confirm an FX Spot deal with the following terms:
Yours—if the counterparty is buying
Mine—if the counterparty is selling

FX OUTRIGHTS

The parsing requirements for FX outrights are similar to those described for FX Spot.

The following is a description of the process followed to complete an FX Outright deal An FX Outright request for quote is sent by a taker to his maker(s)

In response, the maker can either: provide a two way quote (bid and offer) in response to the RFQ—this is only if an amount was indicated in the RFQ; provide a one way quote (bid or offer) in response to the RFQ—this is only if an amount was indicated in the RFQ; provide a quote for a particular amount in response to the RFQ; or indicate that he does not want to supply a quote, no deal takes place.

The taker receives a quote. In response he can either: indicate he wants to buy and confirms the deal; indicate he wants to sell and confirms the deal; cancel the deal—the taker does not like the quote;

The deal is now complete.

The system recognizes the stage at which a deal is at within the dealing process and watches for particular phrases pertinent to the particular stage of the deal process. If no deal is currently in progress within a chat panel, the system monitors the chat panel for indications of a request for quote. The following terms that indicate a request for quote has been initiated within a chat panel conversation are watched for:
An indication of the instrument type (FX Outright)
An indication of a currency pair
An indication of an amount
An indication of the currency of the amount
An indication of a duration/forward date A request for quote shall include at least the following:
an indication of the currency pair
An indication of the instrument type
An indication of a duration/forward date Some examples of a request for quote:
hihi Outrite 3 m CHF pls—The taker is requesting a quote for an FX Outright for USD/CHF maturing in 3 months
hi Out 10 mio CHF 6 m pls—The taker is requesting a quote for an FX Outright in USD/CHF for 10 million USD maturing in 6 months
Hihi o/r cable in 10 maturity 5$^{th}$ Jan. 2001 pls—The taker is requesting a quote for an FX Outright in GBP/USD for 10 million GBP 5$^{th}$ Jan. 2001
Hi frd Outrite GBP/EUR 1 yr pls—the taker is requesting a quote for an FX Outright in GBP/EUR maturing in 1 years time The system parses all variables indicated as part of an RFQ from the conversation to the appropriate field in the Deal stack. If the system has identified a request for quote, and the RFQ has been sent to the maker, it monitors the chat panel for indications of a response to the request for quote.

The following terms within the chat panel that indicate a response to the request for quote are watched for:
indication of a bid quote
indication of an offer quote
indication of a refusal to quote
an indication of an amount A response to a request for quote includes an amount (if not supplied in the RFQ) together with at least one of the following:
  a bid quote
  an offer quote
OR
  a refusal to quote
  Some examples of a response to a request for quote:
  1.4301/08—The maker provides a two way quote, bid/offer
  4696/4700—The maker provides a two way quote bid/offer
  0.87563-62—the maker provides a two way quote bid/offer
  [106.70 90 Spot 107.00 03—the maker provides a two way quote, bid/offer, and the spot split, 107.00/107.03]
  Nothing—Maker refuses to quote All variables indicated by the maker in the response to a request for quote are parsed, from the conversation to the appropriate fields in the Deal Stack. A refusal to quote is indicated if the maker inputs this intention into the chat panel or the maker cancels the deal in the deal stack.

If the maker refuses to quote, the system concludes that the deal has been cancelled, and the monitoring process is restarted, looking for a request for quote within the conversation.

The system ensures that the following variables have been parsed from the conversation to the deal stack prior to permitting the taker to indicate his intention to buy or sell:
  An indication of a duration/forward date
  The currency pair
  The amount
  The currency of the amount
  A bid and/or an offer If the above variables have not all been successfully parsed to the deal stack, the system requests that the maker input the missing variables prior to indicating his intention to send. If the system has identified a response to a request for quote, and the response has been sent to the taker, it monitors the chat panel for a response to the quote. The following terms are watched for within the chat panel that indicate a response to the quote:
  an indication to buy
  an indication to sell
  an indication of a cancellation of the deal A response to a quote includes at least one of the following:
  an indication to buy
  an indication to sell
  an indication of a cancellation of the deal
  Some examples of a response to quote:
  Ok, I buy—the taker is happy with quote and agrees to buy at offer price
  Nothing thks.—the taker does not like the quote and does not wish to deal A cancellation of the deal is indicated if the taker inputs his intention to cancel (he does not like the price) or the taker cancels the deal in the deal stack. If the taker cancels the deal, the system re-starts its monitoring process and looks for a request for quote within the conversation. If the system has identified a response to quote the system confirms the deal in the deal stack and re-starts its monitoring process looking for a request for quote within the conversation.

As part of a request for quote, the system requires the user to enter one of the following terms to indicate that the deal is a FX Outright deal:
  Outright
  Outrite
  Out
  O/r As part of the request for quote, the system requires the user to specify a currency pair. For example:
  Outright 6 m Stg pls=FX Outright 6 months for GBP/USD
  Out 3 m EUR pls=FX Outright, 3 months for EUR/USD
  O/r 23/01 Eur in 10 pls=FX Outright for EUR/USD, amount is 10 million EUR, maturity is $23^{rd}$ Jan. 2001
  Outrite 9 mth CHF for 20=FX Outright, 9 months for USD/CHF, amount is 20 million USD The user is permitted to specify an amount of currency to buy or sell, for example:
  Outrite 10 mio GBP against USD 6 m pls=GBP/USD, 10 million GBP, 6 months duration
  Outrite Eur pls, 10 million US 6 m=EUR/USD, 10 million USD, 6 months duration If the user does not specifically indicate the currency of the amount, the system interprets the amount to represent the amount in the base currency of the currency pair, for example:
  Out eur 10 mio 3 m pls=EUR/USD 10 million EUR, 3 months
  Out chf for 10 months, 20 mio=USD/CHF, 10 months, 20 million USD
  50 mio Welly out pls, 3 m=NZD/USD, 50 million NZD, 3 months The system requires the user to express a duration for the deal as part of the request for quote.

The system shall permit the user to express a maturity date (the terms 'value date' or 'settlement date' can be used) in lieu of a duration as part of the request for quote. The maker may enter the forward bid rate directly to represent the bid quote for an FX Outright. The maker may enter the forward offer rate directly to represent the offer quote for an FX Outright. The user may enter the big figure only once as part of the first part of the quote, be it bid or offer. For example:
  1.4567/70=>bid quote=1.4567, offer quote=1.4570
  121.43/53=>bid quote=121.43, offer quote=121.43

The user may enter a quote without the big figure, i.e. only the pips of the quote. For example:
  67/70=>GBP/USD quote, bid quote=1.4567, offer quote=1.4570
  43/53=>GBP/JPY quote, bid quote=121.43, offer quote=121.53

The user is warned by the system if there is no big figure available. The user may indicate his preference to buy the stated amount of currency at the forward date by using the following terms:
  Buy
  Mine
  M
  B
  Take
  T
  At [Offer Price]
  [Offer Price]

The user can indicate his preference to sell the stated amount of currency at the forward date by using the following terms:
  Sell
  Yours Y
S
Give
G
At [Bid Price]
[Bid Price]
The system permits the taker to indicate his intention to buy or sell. For example:
  I sell CHF=User sells previously indicated amount of CHF
  Y=User sells previously indicated amount in previously indicated currency.
  The system permits the maker to confirm a FX Outright deal with the following terms:
  Yours—if the counterparty is buying
  Mine—if the counterparty is selling FX Forwards Parsing Deal Use Case The following is a description of the process followed to complete an FX Forward deal:

An FX Forward request for quote is sent by a taker to his maker(s)

In response, the maker can either: provide a two way quote in response to the RFQ—this is only if an amount was indicated in the RFQ; provide a one way quote in response to the RFQ—this is only if an amount was indicated in the RFQ; provide a quote for a particular amount in response to the RFQ; or indicate that he does not want to supply a quote, in which case no deal takes place.

The taker (taker of the deal) receives a quote. In response he can either: indicate he wants to sell at near date/buy at far date and confirms the deal; indicate he wants to buy at near date/sell at far date and confirms the deal; or cancel the deal—the taker does not like the quote The maker (maker of the deal) receives notification of the taker's intent. In response he must supply a Spot Rate The taker receives the Spot rate. In response he can either: confirm the deal; or query the Spot Rate.

If the Taker queries the Spot rate, the maker receives notification of the query. In response he can either: supply a new Spot Rate or cancel the deal if the Maker is not happy with any other rate.

The taker receives the new Spot rate. In response he can either: confirm the deal; query the Spot Rate again; or cancel the deal if the Taker is not happy that he will ever get a satisfactory (only available if queried once already).

Once the Taker confirms the Deal it is now complete.

The system recognizes the stage at which a deal is at within the dealing process, and watches for particular phrases pertinent to the particular stage of the deal process. If no deal is currently in progress within a chat panel, the system monitors the chat panel for indications of a request for quote. The system watches for the following terms that indicate a request for quote has been initiated within a chat panel conversation:
  An indication of the instrument type (FX Forward)
  An indication of a currency pair
  An indication of an amount for the near period
  An indication of an amount for the far period
  An indication of the currency of the amounts
  An indication of a duration/forward date for value date
  An indication of duration/forward date for maturity date
A request for quote shall include at least the following:
  an indication of the currency pair
  An indication of the instrument type
  An indication of a duration/forward date Some examples of a request for quote are as follows:
  hihi Fwd 3 m CHF pls—The taker is requesting a quote for an FX Forward for USD/CHF Value date is Spot date maturing in 3 months
  hi Swap 10 mio CHF s/n pls—The taker is requesting a quote for an FX Forward in USD/CHF for 10 million USD spot next (Value date is Spot date, maturity date is day after spot date)
  Hihi Forward cable in 10 maturity $5^{th}$ Jan. 2001 pls—The taker is requesting a quote for an FX Forward in GBP/USD for 10 million GBP value on Spot date maturing on $5^{th}$ Jan. 2001
  Hi frd Fwd-Fwd GBP/EUR 6 months v 1 yr pls—the taker is requesting a quote for an FX Forward in GBP/EUR value date in 6 months maturing in 1 years time
  Hi swp CHF, 6 mths 10 mio at near end 10,500,000 at far—the taker is requesting a quote for a USD/CHF FX Forward, 10 million USD exchanged at spot date and 10,500,000 USD at maturity date (6 months)

The system parses all variables indicated as part of an RFQ from the conversation to the appropriate field in the Deal stack. If the system has identified a request for quote, and the RFQ has been sent to the maker, it monitors the chat panel for indications of a response to the request for quote. The system watches for the following terms within the chat panel that indicate a response to the request for quote:
  Indication of a spot bid quote
  Indication of a spot offer quote
  Indication of a forward quote for value date
  indication of a refusal to quote
  an indication of an amount A response to a request for quote includes an amount (if not supplied in the RFQ) together with at least one of the following:
  a bid quote
  an offer quote
OR
  a refusal to quote Some examples of a response to a request for quote:
  60/56—The maker provides a two way quote, bid/offer
  4696/4700—The maker provides a two way quote bid/offer
  38/30—the maker provides a two way quote bid/offer
  56-60 upto 10—the maker provides a two way quote, bid/offer, and an indication of amount, 10 million, the "upto" is ignored by the system.
  Nothing—Maker refuses to quote The system parses all variables indicated by the maker in the response to a request for quote, from the conversation to the appropriate fields in the Deal Stack. A refusal to quote is indicated if the maker inputs this intention into the chat panel or the maker cancels the deal in the deal stack. If the maker refuses to quote, the system concludes that the deal has been cancelled. If the maker refuses to quote, the system re-starts its monitoring process and look for a request for quote within the conversation. The system ensures that the following variables have been parsed from the conversation to the deal stack prior to permitting the taker to indicate his intention to buy or sell:
  An indication of a duration/forward date
  The currency pair
  A Near amount
  A Far amount The currency of the amount A bid and/or an offer If the above variables have not all been successfully parsed to the deal stack, the system requests that the maker input the missing variables prior to indicating his intention to send. If the system has identified a response to a request for quote, and the response has been sent to the taker, the system monitors the chat panel for a response to the quote.

The system watches for the following terms within the chat panel that indicate a response to the quote:
- an indication to buy/sell (base currency) at the LHS (Left Hand Side) price
- an indication to sell/buy (base currency) at the RHS (Right Hand Side) price
- an indication to buy/sell (foreign currency) at the RHS price
- an indication to sell/buy (foreign currency) at the LHS price
- an indication of a cancellation of the deal A response to a quote shall include at least one of the following:
- an indication to buy/sell
- an indication to sell/buy
- an indication of a cancellation of the deal Some examples of a response to quote:
- Ok, I buy/sell—the taker is happy with quote and agrees to buy local currency on spot date and sell local currency at maturity at the RHS price
- Ok, I s/b—the taker is happy with quote and agrees to sell local currency on spot date and buy local currency at maturity at the LHS price
- Nothing thks.—the taker does not like the quote and does not wish to deal A cancellation of the deal is indicated if the taker inputs his intention to cancel (he does not like the price) or the taker cancels the deal in the deal stack. If the taker cancels the deal, the system re-starts its monitoring process and looks for a request for quote within the conversation. If the system has identified a response to quote, and the response to quote has been sent to the maker, the system monitors the chat panel for provision of Spot Rate. The system watches for the following terms within the chat panel that indicate a provision of Spot Rate:
- a provision of Spot Rate
- an indication of a cancellation of the deal (only if Spot rate has already been queried Some examples of a provision of Spot Rate:
1.4350—the maker is willing to use a Spot Rate of 1.435

If the system has identified a provision of spot rate, and the rate has been sent to the taker, the system shall monitor the chat panel for response to the Spot Rate The system watches for the following terms within the chat panel that indicate a response to the Spot Rate:
- an indication of deal confirmation
- an indication of querying the Spot rate
- an indication of a cancellation of the deal (only if at least one rate has previously been provided Some examples of a querying the Spot rate are as follows:
check spot—terse minimum query
check spot seems high—qualified query The system shall return the entire line that includes the querying of the Spot rate and use it as the text to a Spot Rate Query warning to the maker:

Some examples of a Deal Confirmation are:
Ok—confirmation, deal is complete
Confirm—confirmation, deal is complete
Done—Confirmation, deal is complete If the maker confirms the deal within the conversation, the system confirms the related deal entry within the Deal Stack. A cancellation of the deal is indicated if the maker inputs his intention to cancel (he does not like something) or the maker cancels the deal in the deal stack. If the maker or taker cancels the deal, the system re-starts its monitoring process and look for a request for quote within the conversation. Once the taker has confirmed the deal, the system confirms the deal in the deal stack and re-starts its monitoring process and looks for a request for quote within the conversation.

As part of a request for quote, the system requires the user to enter one of the following terms to indicate that the deal is a FX Forward deal.
Swap
Swp
Fwd
Forward
Fwd-fwd
Fwd fwd
Fwdfwd
Fwd/fwd As part of the request for quote, the system requires the user to specify a currency pair. For example:
Swap 6 m Stg pls=FX Forward 6 months for GBP/USD
Swp 3 m EUR pls=FX Forward, 3 months for EUR/USD
Fwd 23/01 Eur in 10 pls=FX Forward for EUR/USD, amount is 10 million EUR, maturity is $23^{rd}$ Jan. 2001
Forward 9 mth CHF for 20=FX Forward, 9 months for USD/CHF, amount is 20 million USD The system permits the user to specify an amount of currency to buy or sell, for example:
Swp 10 mio GBP against USD 6 m pls=GBP/USD, 10 million GBP, 6 months duration
Swap Eur pls, 10 million US 6 m=EUR/USD, 10 million USD, 6 months duration If the user does not specifically indicate the currency of the amount, the system interprets the amount to represent the amount in the base currency of the currency pair. For example:
Out eur 10 mio 3 m pls=EUR/USD 10 million EUR, 3 months
Out chf for 10 months, 20 mio=USD/CHF, 10 months, 20 million USD
50 mio Welly out pls, 3 m=NZD/USD, 50 million NZD, 3 months The system permits the user to enter a second amount to represent the amount far end (maturity date) of the FX Forward. The system permits the user to indicate the amount at the far end of the FX Forward in the following formats:
[Amount] at far end/leg
split amount (at far end/leg) [Amount]
[Amount] split amount (at far end/leg)
Cock amount (at far end/leg) [Amount]
[Amount] cock amount (at far end/leg)

The system permits the user to express a duration for the deal as part of the request for quote, and permits the user to express a maturity date in lieu of a duration as part of the request for quote. The user can express a period to represent the value date, and can express a date to represent the value date in lieu of a period. The user may enter points to represent the bid quote for an FX Forward Deal and to represent the offer quote for an FX Forward Deal. If the user enters both a bid and offer quote in points, the system interprets and parses the first value (on the left) of the two quotes as the bid quote, and interprets and parses the second value (on the right) of the two quotes as the offer quote. In this case, and the bid quote is higher than the offer quote and the value date is prior to spot date (e.g. tomorrow), the system adds the bid quote points (on the left) to the spot bid rate to calculate the forward bid rate. This rate represents the rate at which you buy base currency on the first leg (near date) of the FX Forward. In this situation, the forward rate for the currency pair is less than then the near rate. If, the bid quote is higher than the offer quote and the value date is prior to spot date (e.g. tomorrow), the system adds the offer quote points (on the right) to the spot offer rate to calculate the forward offer rate. This rate represents the rate at which you sell base currency on the first leg (near date) of the FX Forward. In this situation, the forward rate for the currency pair is less than then the near rate. If the bid quote is higher than the offer quote and the maturity date is after the spot date (e.g. 1 week), the system subtracts the bid quote points (on the left) from the spot bid rate to calculate the forward bid rate. This rate represents the rate at which you sell base currency on the second leg (far date) of the FX Forward. In this situation, the forward rate for the currency pair is less than then the near rate. If the bid quote is higher than the offer quote and the maturity date is prior to spot date (e.g. tomorrow), the system subtracts the offer quote points (on the right) to the spot offer rate to calculate the forward offer rate. This rate will represent the rate at which you buy base currency on the second leg (far date) of the FX Forward. In this situation, the forward rate for the currency pair is less than then the near rate.

If the bid quote is lower than the offer quote and the value date is prior to spot date (e.g. tomorrow), the system shall subtract the bid quote points (on the left) from the spot bid rate to calculate the forward bid rate. This rate represents the rate at which you buy base currency on the first leg (near date) of the FX Forward. In this situation, the forward rate for the currency pair is more than then the near rate.

If the bid quote is lower than the offer quote and the value date is prior to spot date (e.g. tomorrow), the system subtracts the offer quote points (on the right) from the spot offer rate to calculate the forward offer rate. This rate represents the rate at which you sell base currency on the first leg (near date) of the FX Forward. In this situation, the forward rate for the currency pair is more than then the near rate.

If the bid quote is lower than the offer quote and the maturity date is after the spot date (e.g. 1 week), the system adds the bid quote points (on the left) to the spot bid rate to calculate the forward bid rate. This rate represents the rate at which you sell base currency on the second leg (far date) of the FX Forward. In this situation, the forward rate for the currency pair is more than then the near rate.

If the bid quote is higher than the offer quote and the maturity date is prior to spot date (e.g. tomorrow), the system adds the offer quote points (on the right) to the spot offer rate to calculate the forward offer rate. This rate represents the rate at which you buy base currency on the second leg (far date) of the FX Forward. In this situation, the forward rate for the currency pair is more than then the near rate.

The user can enter a spot bid quote in association with the FX Forward to represent the spot bid rate and can enter a spot offer quote in association with the FX Forward to represent the spot offer rate. If the user has not entered a spot bid quote in association with the FX Forward, the system uses the spot market mid rate of the particular currency pair to represent the spot bid rate. If the user has not entered a spot bid quote in association with the FX Forward, the system uses the spot market mid rate of the particular currency pair to represent the spot offer rate.

If neither of the two legs of the swap fall on Spot date, the system permits the user to enter a value date bid quote in association with the FX Forward and to enter a value date offer quote in association with the FX Forward.

The user can enter the forward bid or offer rate directly to represent the bid quote for an FX Forward.

If the user is quoting using the forward rates, the system shall interpret the first of the rates (on the left) as the bid quote and the second of the rates (on the right) as the offer quote.

The user can indicate his preference to Buy the stated amount of currency at the near date and sell the stated amount of currency at the far date by using the following terms:
buy/sell
buy sell
b/s
b s
I buy [amount] [currency] on [value date]

The user can indicate his preference to sell the stated amount of currency at the near date and buy the stated amount of currency at the far date, by using the following terms:
sell/buy
Sell buy
sell&buy
s/b
s b
I sell [amount] [currency] on [value date]

The user can indicate his intention to buy/sell or sell/buy. For example:
I sell/buy CHF=User sells/buys previously indicated amount of CHF
S/b=User sells/buys previously indicated amount in previously indicated currency In the case of an FX Forward deal where the taker is selling/buying, the system permits the maker to confirm the deal with the following additional terms:
buy/sell
buy sell
buy&sell
b/s
b s In the case of an FX Forward deal where the taker is buying/selling, the system permits the maker to confirm the deal with the following additional terms:
sell/buy
Sell buy
s/b
s b In the case of an FX Forward deal where the maker is supplying a Spot Rate, the system permits the maker to supply the rate without the big figure. The system warns the user if there is no market rate available from which to derive the big figure.

It will be appreciated from the above that the invention provides a highly advantageous interface to the user in which the deal stack is presented to the user in a manner which is easy to interpret by the dealer who has to assimilate a lot of information, often in a very short space of time. By separating out information which is common to all instruments from information specific to a deal in any particular instrument, it is possible to present a deal list which is simple and easy to view. However, as the deal detail panel includes information related to a selected deal, the trader is never left without essential information relating to the deal on which he is working.

When trading on the system described, the trader has the choice of entering deal information through conversational chat which is parsed by the system or directly preferably using buttons on the user interface or keyboard driven menus. The trader can switch between the two during the progress of a deal. This flexibility is possible as the deal related information input, whether it is parsed conversation or direct input only conveys to the deal stack that there has been a change of deal status. All other deal related activities are performed by the deal stack and include sending necessary messages to the rest of the system, for example to other trader terminal of to back office systems to produce deal tickets. The deal stack is also responsible for changing the functionality of the buttons on the button bar and the keyboard menus which are all deal status dependent.

It will be noted from the above that the activity of the parser in the deal process is limited to detecting changes in deal status. This enables the system to be more flexible. This contrasts with prior art systems which operate by a rigid exchange of conversational messages in which only one trader can 'own' the cursor to a conversation at any one time. In the system described any party to a deal can enter conversations into the system at any time. However, if the conversation does not include terms which the parser is pre-programmed to recognise a deal related in that deal status, the conversation will not affect the deal process. Thus, the conversation does not have to ping pong from one party to the other. At any stage in the deal making process, the last party to send a conversational message can send a further message. If this does not contain content relevant to the deal in its present status it will be ignored by the parser and will not affect the deal.

Many modifications to the system described are possible within the scope of the invention. In particular the invention is not limited to any particular type of instruments, not to any type of trading system architecture beyond the limitations of the claims appended hereto.

The invention claimed is:

1. A conversational dealing system for trading instruments between counterparties, comprising a plurality of trader terminals, the trader terminals communicating with each other via a communications network, each trader terminal having:
   (a) a user interface for inputting and displaying to the trader deal related information, each trader terminal user interface comprising:
      (i) a deal stack holding a plurality of deals in which the trader is participating, the deal stack including status of each deal and a deal description, each deal having a plurality of statuses after initiation and before completion of the deal; and
      (ii) means for entering conversational deal related information; and
   (b) a parser for parsing the conversational deal related information to detect a change in or an intention to change deal status; and for notifying the deal stack of the change in deal status;
   whereby on receipt of a changed deal status notification, the deal stack generates a deal string appropriate to the changed deal status,
   wherein information looked for by the parser during parsing is determined in accordance with a current deal status.

2. A conversational dealing system according to claim 1, wherein the parser is deal status dependent, whereby the parser parses conversation input by the trader to detect in the conversation a predetermined content related to the deal status.

3. A conversational dealing system according to claim 2, wherein the system analyses the parsed deal status information provided by the parser to detect the presence of a plurality of predetermined deal variables.

4. A conversational dealing system according to claim 1, wherein a deal is initiated, by a taker and the parser parses conversation input into the system by the deal maker and deal taker.

5. A conversational dealing system according to claim 1, wherein, in the absence of any deal related information in the parsed conversation, the parser monitors the conversation for a request for a quote (RFQ).

6. A conversational dealing system according to claim 1, wherein the parser has a list of terms pertinent to each deal stage for a given instrument and, on detection of a term in the list for a given deal stage, parses the terms and variables in the conversation.

7. A conversational dealing system according to claim 1, further comprising means for inputting non-conversational deal related information.

8. A conversational dealing system according to claim 7, wherein the means for inputting non-conversational deal related information comprises deal status dependent buttons on the deal stack.

9. A conversational dealing system according to claim 7, wherein the means for inputting non-conversational deal related information comprises a plurality of deal status dependent keyboard driven menus.

10. A conversational dealing system according to claim 1, wherein the means for entering conversational deal related information comprises a conversation panel in the user interface.

11. A conversational dealing system according to claim 1, wherein deal related information input into the system via means for inputting non-conversational deal related information is converted into conversation and entered into the conversation.

12. A conversational dealing system according to claim 1, wherein each deal in the deal stack has an associated conversation.

13. A conversational dealing system according to claim 1, wherein the trader terminal further includes a messaging system for sending deal related messages to the dealing system when the status of a deal in the deal stack changes, the messages sent being dependent on the status of the deal.

14. A conversational dealing system according to claim 1, wherein the instruments include at least one financial instrument.

15. A conversational dealing system according to claim 14 wherein the at least one financial instrument is a foreign exchange (FX) instrument.

16. A conversational dealing system according to claim 15, wherein each deal status has an associated deal string.

17. A conversational dealing system, according to claim 15, further comprising non-conversational means for the trader to input deal status changes into the trading system.

18. A conversational dealing system according to claim 17, wherein the non-conversational means for entering deal status changes includes a plurality of deal status dependent buttons on the deal stack.

19. A conversational dealing system according to claim 1, wherein the information looked for by the parser for a given deal status is a subset of information for all deal statuses.

20. A conversational dealing system for trading instruments between counterparties, comprising a plurality of trader terminals each having a user interface for inputting and displaying to the trader deal related information, the trader terminals communicating with each other via a communications network, wherein the trader terminal user interfaces further comprise:
   a deal stack holding a plurality of deals in which the trader is participating the deal stack including status of each deal and a deal description, each deal having a plurality of statuses after initiation and before completion of the deal; and
   a conversation panel for entering conversational deal related information; and the trader terminals further comprise a parser for parsing the conversational deal related information to detect a change in or an intention to change deal status; and for communicating to the deal stack the change in deal status;
   whereby a changed deal status causes a new deal string to be generated in the deal stack appropriate to the changed deal status,
   wherein information looked for by the parser during parsing is determined in accordance with a current deal status.

21. A conversational dealing system according to claim 20, wherein the parser monitors the conversation in the conversation panel for predetermined terms dependent on the deal status.

22. A conversational dealing system according to claim 21, wherein the parser comprises a list of deal statuses and associated terms indicating a change of status.

23. A conversational dealing system according to claim 20, wherein the information looked for by the parser for a given deal status is a subset of information for all deal statuses.

24. A trader terminal for a conversational dealing system having a plurality of trader terminals for trading instruments between counterparty traders, the trader terminals communicating with each other via a communications network, the trader terminal comprising:
   (a) user interface for inputting and displaying to the trader deal related information, the user interface comprising:
      (i) a deal stack holding a plurality of deals in which the trader is participating, the deal stack including the status of each deal and a deal description, each deal having a plurality of statuses after initiation and before completion of the deal; and
      (ii) means for entering conversational deal related information; and
   (b) a parser for parsing the conversational deal related information to detect a change in deal status; and for notifying the deal stack of the change in deal status;
   whereby on receipt of a changed deal status notification, the deal stack generates a deal string appropriate to the change deal status,
   wherein information looked for by the parser during parsing is determined in accordance with a current deal status.

25. A trader terminal according to claim 24, wherein the parser is deal status dependent, whereby the parser parses conversation input by the trader to detect in the conversation a predetermined content related to the deal status.

26. A trader terminal according to claim 25, wherein the system analyses the parsed deal status information provided by the parser to detect the presence of a plurality of predetermined deal variables.

27. A trader terminal according to claim 24, wherein a deal is initiated by a taker and the parser parses conversation input into the system my the deal maker.

28. A trader terminal according to claim 24, wherein, in the absence of any deal related information in the parsed conversation, the parser monitors the conversation for a request for a quote (RFQ).

29. A trader terminal according to claim 24, wherein the parser has a list of terms pertinent to each deal stage for a given instrument and, on detection of a term in the list for a given deal stage, parses the terms and variables in the conversation.

30. A trader terminal according to claim 24, further comprising means for inputting non-conversational deal related information.

31. A trader terminal according to claim 30, wherein the means for inputting non-conversational deal related information comprises deal status dependent buttons on the deal stack.

32. A trader terminal according to claim 30, wherein the means for inputting non-conversational deal related information comprises a plurality of deal status dependent keyboard driven menus.

33. A trader terminal according to claim 30, wherein the means for entering conversational deal related information comprises a conversation panel in the user interface.

34. A trader terminal according to claim 24, wherein each deal in the deal stack has an associated conversation.

35. A trader terminal according to claim 24, wherein the trader terminal further includes a messaging system for sending deal related messages to the dealing system when the status of a deal in the deal stack changes, the messages sent being dependent on the status of the deal.

36. A trader terminal according to claim 24, wherein the instruments include at least one financial instrument.

37. A trader terminal according to claim 36 wherein the at least one financial instrument is a foreign exchange (FX) instrument.

38. A trader terminal according to claim 24, wherein the information looked for by the parser for a given deal status is a subset of information for all deal statuses.

39. A conversational dealing system for trading instruments between counterparties, comprising a plurality of trader terminals, the trader terminals communicating with each other via a communications network, each trader terminal having:
   (a) a user interface for inputting and displaying to the trader deal related information, each trader terminal user interface comprising:
      (i) a deal stack holding a plurality of deals in which the trader is participating, the deal stack including status of each deal and a deal description, each deal having a plurality of statuses after initiation and before completion of the deal;
      (ii) means for entering deal related information as conversations between traders; and
      (iii) means for entering deal related information directly to the deal stack; and
   (b) a parser for parsing the conversational deal related information to detect a change in deal status; and for notifying the deal stack of the change in deal status;
   whereby on receipt of a changed deal status notification from the parser or from deal related information entered via the direct deal entering means, the deal stack generates a deal string appropriate to the changed deal status, wherein information looked for by the parser during parsing is determined in accordance with a current deal status.

40. A conversational dealing system according to claim 39, wherein the means for entering deal related information in to the system comprises deal specific buttons on the deal stack.

41. A conversation dealing system according to claim 39, wherein the means for entering deal related information into the system comprises keyboard driven menus.

42. A conversational dealing system according to claim 39, wherein the information looked for by the parser for a given deal status is a subset of information for all deal statuses.

43. A trader terminal for a conversational dealing system having a plurality of trader terminals for trading instruments between counterparty traders, the trader terminals communicating with each other via a communications network, the trader terminal comprising:
  (a) a user interface for inputting and displaying to the trader deal related information, the user interface comprising:
    (i) a deal stack holding a plurality of deals in witch the trader is participating, the deal stack including status of each deal and a deal description, each deal having a plurality of statuses after initiation and before completion of the deal;
    (ii) means for entering deal related information as conversations between traders; and
    (iii) means for entering deal related information directly to the deal stack; and
  (b) a parser for parsing the conversational deal related information to detect a change in deal status; and for notifying the deal stack of the change in deal status;
whereby on receipt of a changed deal status notification from the parser or from deal related information entered via the direct deal entering means, the deal stack generates a deal string appropriate to the changed deal status,
wherein information looked for by the parser during parsing is determined in accordance with a current deal status.

* * * * *